US012614494B2

(12) United States Patent
Bi et al.

(10) Patent No.: US 12,614,494 B2
(45) **Date of Patent: *Apr. 28, 2026**

(54) METHOD AND APPARATUS FOR OBTAINING CORRESPONDENCES BETWEEN GRAYSCALES AND GRAYSCALE VOLTAGES, AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Xin Bi, Beijing (CN); Kun Zuo, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,725

(22) Filed: Mar. 21, 2024

(65) Prior Publication Data

US 2024/0257694 A1 Aug. 1, 2024

Related U.S. Application Data

(62) Division of application No. 17/631,404, filed as application No. PCT/CN2021/077240 on Feb. 22, 2021, now Pat. No. 11,967,264.

(51) Int. Cl.

| | |
|---|---|
| ***G09G 3/20*** | (2006.01) |
| *G09G 3/32* | (2016.01) |
| *G09G 3/36* | (2006.01) |

(52) U.S. Cl.
CPC ......... *G09G 3/2074* (2013.01); *G09G 3/2007* (2013.01); *G09G 3/2092* (2013.01);
(Continued)

(58) Field of Classification Search
CPC .. G09G 3/2007; G09G 3/2074; G09G 3/2092; G09G 3/32; G09G 3/36;
(Continued)

(56) References Cited

U.S. PATENT DOCUMENTS 5,245,326 A * 9/1993 Zalph .................. G09G 3/3696 345/904
7,504,979 B1 3/2009 Knausz et al.
(Continued)

FOREIGN PATENT DOCUMENTS

CN 101075415 A 11/2007
CN 103943051 A 7/2014
(Continued)

OTHER PUBLICATIONS

International Search Report and Written Opinion for the PCT Application No. PCT/CN2021/077240 by the Chinese Patent Office on Nov. 3, 2021.

(Continued)

*Primary Examiner* — Jason M Mandeville
(74) *Attorney, Agent, or Firm* — XSENSUS LLP

(57) ABSTRACT

A display apparatus includes a display panel, a memory, and a driver. The memory stores at least one set of correspondences, and each set of correspondences includes $2^N$ grayscale data and $2^N$ register values in a one-to-one correspondence with the $2^N$ grayscale data; each register value represents a grayscale voltage value of corresponding grayscale data; and N is a positive integer greater than or equal to 6. The driver obtains the at least one set of correspondences from the memory; receives image data from a signal
(Continued)

transmission interface, the image data including a plurality of grayscale data corresponding to a plurality of sub-pixels; for any grayscale data in the image data, obtains a register value corresponding to the grayscale data in a set of correspondences; and outputs a grayscale voltage corresponding to a grayscale voltage value represented by the register value to the display panel according to the register value.

15 Claims, 14 Drawing Sheets

(52) U.S. Cl.
CPC ................. *G09G 3/32* (2013.01); *G09G 3/36* (2013.01); *G09G 2300/0452* (2013.01); *G09G 2310/0264* (2013.01); *G09G 2310/0267* (2013.01); *G09G 2310/027* (2013.01); *G09G 2310/0291* (2013.01); *G09G 2320/0626* (2013.01); *G09G 2330/028* (2013.01); *G09G 2360/16* (2013.01)

(58) Field of Classification Search
CPC ... G09G 2300/0452; G09G 2310/0264; G09G 2310/0267; G09G 2310/027; G09G 2310/0291; G09G 2320/0626; G09G 2330/028; G09G 2360/16
USPC .......................................................... 345/694
See application file for complete search history.

(56) References Cited

U.S. PATENT DOCUMENTS 8,542,256 B2 9/2013 Kim
11,967,264 B2 * 4/2024 Bi ........................ G09G 3/2007
2007/0013725 A1 * 1/2007 Burkhardt ............ G09G 3/2007
345/690
2007/0268524 A1 11/2007 Nose et al.
2014/0063079 A1 3/2014 Lee et al.
2014/0198134 A1 7/2014 Moon et al.
2015/0123955 A1 5/2015 Bi et al.
2016/0379594 A1 12/2016 Cho et al.
2019/0122607 A1 4/2019 Yan
2020/0112654 A1 4/2020 Saito et al.
2020/0152134 A1 5/2020 Lee et al.
2022/0301482 A1 9/2022 Wang et al.

FOREIGN PATENT DOCUMENTS

CN 104332151 A 2/2015
CN 110349537 A 10/2019
CN 110556077 A 12/2019
CN 111833793 A 10/2020
KR 10-2018-0043563 A 4/2018
WO 2008/150855 A1 12/2008

OTHER PUBLICATIONS

Office Action for the U.S. Appl. No. 17/631,404 issued by the USPTO on Apr. 21, 2023.
Office Action for the U.S. Appl. No. 17/631,404 issued by the USPTO on Sep. 11, 2023.
Notice of Allowance for the U.S. Appl. No. 17/631,404 issued by the USPTO on Dec. 22, 2023.

* cited by examiner

| A set of correspondences | |
|---|---|
| Grayscale data | Register value |
| $F_0$ | $H_0$ |
| $F_1$ | $H_1$ |
| $F_2$ | $H_2$ |
| $F_3$ | $H_3$ |
| $F_4$ | $H_4$ |
| ... | ... |
| $F_{255}$ | $H_{255}$ |

FIG. 3

| First set of correspondences | | Second set of correspondences | | Third set of correspondences | |
|---|---|---|---|---|---|
| Grayscale data | Register value | Grayscale data | Register value | Grayscale data | Register value |
| $RF_0$ | $RH_0$ | $GF_0$ | $GH_0$ | $BF_0$ | $BH_0$ |
| $RF_1$ | $RH_1$ | $GF_1$ | $GH_1$ | $BF_1$ | $BH_1$ |
| $RF_2$ | $RH_2$ | $GF_2$ | $GH_2$ | $BF_2$ | $BH_2$ |
| $RF_3$ | $RH_3$ | $GF_3$ | $GH_3$ | $BF_3$ | $BH_3$ |
| $RF_4$ | $RH_4$ | $GF_4$ | $GH_4$ | $BF_4$ | $BH_4$ |
| ... | ... | ... | ... | ... | ... |
| $RF_{255}$ | $RH_{255}$ | $GF_{255}$ | $GH_{255}$ | $BF_{255}$ | $BH_{255}$ |

FIG. 4

METHOD AND APPARATUS FOR OBTAINING CORRESPONDENCES BETWEEN GRAYSCALES AND GRAYSCALE VOLTAGES, AND DISPLAY APPARATUS

CROSS-REFERENCE TO RELATED APPLICATIONS

This application is a divisional application of U.S. patent application Ser. No. 17/631,404, filed on Jan. 28, 2022, which claims priority to International Patent Application No. PCT/CN2021/077240, filed on Feb. 22, 2021, which are incorporated herein by reference in their entirety.

TECHNICAL FIELD

The present disclosure relates to the field of display technologies, and more particularly, to a method and an apparatus for obtaining correspondences between grayscales and grayscale voltages, and a display apparatus.

BACKGROUND

A grayscale curve is a characteristic curve that shows a relationship between grayscales and luminance of a display product. For the consistency between the displayed luminance and requirements of human vision, a gamma correction is introduced in manufacturing of the display product, so that a display effect of the display product may be optimal.

SUMMARY

In an aspect, a display apparatus is provided. The display apparatus includes a display panel, a memory, and a driver. The display panel includes a plurality of sub-pixels. The driver is coupled to the memory, a signal transmission interface, and the display panel.

The memory is configured to store at least one set of correspondences, and each set of correspondences includes $2^N$ grayscale data and $2^N$ register values in a one-to-one correspondence with the $2^N$ grayscale data, each register value is used to represent a grayscale voltage value of a respective grayscale data, and N is a positive integer greater than or equal to 6.

The driver is configured to: obtain the at least one set of correspondences from the memory, and receive image data from the signal transmission interface, the image data including a plurality of grayscale data corresponding to the plurality of sub-pixels; for any grayscale data in the image data, obtain a register value corresponding to the grayscale data from a set of correspondences; and output, according to the register value, a grayscale voltage corresponding to a grayscale voltage value represented by the register value to a sub-pixel of the display panel.

In some embodiments, the plurality of sub-pixels include sub-pixels of a first color, sub-pixels of a second color, and sub-pixels of a third color, and the first color, the second color, and the third color are three primary colors. The at least one set of correspondences includes three sets of correspondences, and the three sets of correspondences are respectively used for obtaining of grayscale voltage values of the sub-pixels of the first color, the sub-pixels of the second color, and the sub-pixels of the third color in the display panel.

The driver is further configured to: for any grayscale data in the image data, determine a color of a sub-pixel corresponding to the grayscale data, and determine a set of correspondences from the three sets of correspondences according to the color of the sub-pixel, the determined set of correspondence being used for obtaining of grayscale voltage values of sub-pixels, having a same color as the sub-pixel, in the sub-pixels of the first color, the sub-pixels of the second color, and the sub-pixels of the third color; and obtain a register value corresponding to the grayscale data from the determined set of correspondences.

In some embodiments, the memory is a non-volatile memory.

In some embodiments, the driver includes: a random memory, a plurality of registers, a controller, and a grayscale voltage output circuit. The random memory is coupled to the non-volatile memory. The random memory is further coupled to the signal transmission interface. The plurality of registers are coupled to the random memory. The controller is coupled to the random memory and the plurality of registers. The grayscale voltage output circuit is coupled to the plurality of registers and the display panel.

The random memory is configured to obtain and temporarily store the at least one set of correspondences from the non-volatile memory. The random memory is further configured to obtain the image data from the signal transmission interface. The controller is configured to control a register to obtain, according to each grayscale data in the image data, a register value corresponding to the grayscale data from a set of correspondences in the random memory, and control and the register to temporarily store the register value. The grayscale voltage output circuit is configured to output, according to the register value stored in the register, a grayscale voltage corresponding to a grayscale voltage value represented by the register value to the display panel.

In some embodiments, the grayscale voltage output circuit includes: a first voltage generating circuit and a plurality of first gating circuits. The first voltage generating circuit is coupled to a first voltage terminal and a second voltage terminal. Each first gating circuit is coupled to the first voltage generating circuit, a register, and the display panel.

The first voltage generating circuit is configured to obtain a plurality of third voltages according to a first voltage of the first voltage terminal and a second voltage of the second voltage terminal, and the first voltage is greater than the second voltage. Each first gating circuit is configured to output a voltage of the first voltage, the second voltage and the plurality of third voltages from the first voltage generating circuit to the display panel according to the register value stored in the register, the voltage is a grayscale voltage corresponding to the grayscale voltage value represented by the register value.

In some embodiments, the grayscale voltage output circuit further includes: a second voltage generating circuit, a second gating circuit, and a third gating circuit. The second voltage generating circuit is coupled to a first reference voltage terminal and a second reference voltage terminal. The second gating circuit is coupled to the first voltage terminal and the second voltage generating circuit. The third gating circuit is coupled to the second voltage terminal and the second voltage generating circuit.

The second voltage generating circuit is configured to obtain a plurality of divided voltages according to a first reference voltage of the first reference voltage terminal and a second reference voltage of the second reference voltage terminal. The second gating circuit is configured to output a divided voltage of the plurality of divided voltages according to a register value among the $2^N$ register values that represents a maximum grayscale voltage value, this divided voltage is the first voltage. The third gating circuit is configured to output a divided voltage of the plurality of divided voltages according to a register value among the $2^N$ register values that represents a minimum grayscale voltage value, this divided voltage is the second voltage.

In some embodiments, the grayscale voltage output circuit further includes a plurality of operational amplifiers. A first gating circuit is coupled to an operational amplifier, the second gating circuit is coupled to an operational amplifier, and the third gating circuit is coupled to an operational amplifier. Each operational amplifier is configured to amplify a grayscale voltage from a respective gating circuit.

In some embodiments, the second gating circuit is further coupled to a register. The controller is configured to control the register coupled to the second gating circuit to: obtain and store the register value among the $2^N$ register values that represents the maximum grayscale voltage value; and output the register value among the $2^N$ register values that represents the maximum grayscale voltage value to the second gating circuit.

In some embodiments, the third gating circuit is further coupled to a register. The controller is configured to control the register coupled to the third gating circuit to: obtain and store the register value among the $2^N$ register values that represents the minimum grayscale voltage value; and output the register value among the $2^N$ register values that represents the minimum grayscale voltage value to the third gating circuit.

In some embodiments, the first voltage generating circuit includes a first resistor string; and both ends of the first resistor string are respectively coupled to the second gating circuit and the third gating circuit.

In some embodiments, the second voltage generating circuit includes a second resistor string; and both ends of the second resistor string are respectively coupled to the first reference voltage terminal and the second reference voltage terminal.

In some embodiments, the first gating circuit, the second gating circuit, and the third gating circuit each adopt a multiplexer.

In some embodiments, the display apparatus is capable of displaying $2^N$ grayscales in a one-to-one correspondence with the $2^N$ grayscale data. The $2^N$ grayscales include at least two first grayscales and a plurality of second grayscales between two adjacent first grayscales in the at least two first grayscales, and the two adjacent first grayscales are respectively a maximum grayscale corresponding to the maximum grayscale voltage value and a minimum grayscale corresponding to the minimum grayscale voltage value. A grayscale voltage value of each second grayscale between the maximum grayscale and the minimum grayscale is satisfy a formula:

$$V_i = \frac{(V_{MAX} - V_{MIN})}{\left(G_{MAX}^{\beta} - G_{MIN}^{\beta}\right)} \times G_i^{\beta} - \frac{(V_{MAX} - V_{MIN})}{\left(G_{MAX}^{\beta} - G_{MIN}^{\beta}\right)} \times G_{MIN}^{\beta} + V_{MAX},$$

where $V_{MAX}$ represents the maximum grayscale voltage value, $V_{MIN}$ represents the minimum grayscale voltage value, $G_{MAX}$ represents the minimum grayscale, $G_{MIN}$ represents the minimum grayscale, $G_i$ represents a second grayscale, $V_i$ represents a grayscale voltage value corresponding to the second grayscale $G_i$, and β represents a preset parameter.

In some embodiments, the preset parameter is in a range of −0.1 to 2.4, inclusive.

In some embodiments, a grayscale and a corresponding grayscale voltage value satisfy a formula: $V_x = A \times G_x^{\beta} + B$. The grayscale is an analog value of grayscale data, $V_x$ represents the grayscale voltage value, $G_x$ represents the grayscale, β represents a preset parameter, and A and B represent scale factors.

In some embodiments, the preset parameter is in a range of −0.1 to 2.4, inclusive.

In some embodiments, the display apparatus is capable of displaying $2^N$ grayscales in a one-to-one correspondence with the $2^N$ grayscale data. The $2^N$ grayscales include at least two first grayscales and a second grayscales between two adjacent first grayscales in the at least two first grayscales. A grayscale voltage value corresponding to the second grayscale and the two adjacent first grayscales and grayscale voltage values corresponding to the two adjacent first grayscales satisfy a formula:

$$V_3 = \frac{(V_1 - V_2)}{\left(G_1^{\beta} - G_2^{\beta}\right)} \times G_3^{\beta} - \frac{(V_1 - V_2)}{\left(G_1^{\beta} - G_2^{\beta}\right)} \times G_1^{\beta} + V_1,$$

where $V_3$ represents a grayscale voltage value corresponding to the second grayscale, $V_2$ and $V_1$ represent the grayscale voltage values corresponding to the two adjacent first grayscales, $G_3$ represents the second grayscale, $G_2$ and $G_1$ represent the two adjacent first grayscales, and β represents a preset parameter.

In some embodiments, the preset parameter is greater than or equal to −0.1 and less than 1, or the preset parameter is greater than 1 and less than or equal to 2.4.

In some embodiments, N is 8 or 10.

In another aspect, a method for obtaining correspondences between grayscales and grayscale voltages is provided. The method includes: obtaining grayscale voltage values corresponding to at least two first grayscales in a plurality of grayscales, the plurality of grayscales further including a plurality of second grayscales between two adjacent first grayscales; obtaining grayscale voltage values in a one-to-one correspondence with the plurality of second grayscales between the two adjacent first grayscales according to the two adjacent first grayscales and grayscale voltage values corresponding to the two adjacent first grayscales, in a coordinate system formed by grayscales and grayscale voltage values, a connecting line formed by sequentially connecting the grayscale voltage values corresponding to the plurality of second grayscales being nonlinear; and obtaining a set of correspondences according to the plurality of grayscales and a plurality of grayscale voltage values corresponding to the plurality of grayscales, the set of correspondences including the plurality of grayscales and a plurality of register values in a one-to-one correspondence with the plurality of grayscales, and each register value being used to represent a grayscale voltage value of a respective grayscale.

In some embodiments, the plurality of grayscales are $2^N$ grayscales, and N is a positive integer greater than or equal to 6.

In some embodiments, the obtaining the grayscale voltage values corresponding to the at least two first grayscales in the plurality of grayscales includes: for any first grayscale, measuring an actual brightness of a display panel when sub-pixels of a color in the display panel displays the first grayscale; and in a case where the actual brightness of the display panel reaches a target brightness of the first grayscale, taking a measured value of a driving voltage corresponding to the sub-pixels of the color in the display panel as a grayscale voltage value corresponding to the first grayscale.

In some embodiments, the obtaining the grayscale voltage values in one-to-one correspondence with the plurality of second grayscales between the two adjacent first grayscales according to the two adjacent first grayscales and the grayscale voltage values corresponding to the two adjacent first grayscales includes: performing a nonlinear interpolation according to the two adjacent first grayscales and the grayscale voltage values corresponding to the two adjacent first grayscales to obtain the grayscale voltage values corresponding to the plurality of second grayscales between the two adjacent first grayscales.

In some embodiments, a second grayscale, a grayscale voltage value corresponding to the second grayscale and the two adjacent first grayscales and the grayscale voltage values corresponding to the two adjacent first grayscales satisfy a formula:

$$V_3 = \frac{(V_1 - V_2)}{\left(G_1^\beta - G_2^\beta\right)} \times G_3^\beta - \frac{(V_1 - V_2)}{\left(G_1^\beta - G_2^\beta\right)} \times G_1^\beta + V_1.$$

$V_3$ represents the grayscale voltage value corresponding to the second grayscale, $V_2$ and $V_1$ represent the grayscale voltage values corresponding to the two adjacent first grayscales, $G_3$ represents the second grayscale, $G_2$ and $G_1$ represent the two adjacent first grayscales, and $\beta$ represents a preset parameter.

In some embodiments, the preset parameter is in a range of −0.1 to 2.4, inclusive.

In yet another aspect, an apparatus for obtaining correspondences between grayscales and grayscale voltages is provided. The apparatus includes: a first processing unit, a second processing unit, and a third processing unit. The first processing unit is configured to obtain grayscale voltage values corresponding to at least two first grayscales in a plurality of grayscales. There exist a plurality of second grayscales between two adjacent first grayscales in the at least two first grayscales. The second processing unit is configured to obtain grayscale voltage values in a one-to-one correspondence with the plurality of second grayscales between the two adjacent first grayscales according to the two adjacent first grayscales and grayscale voltage values corresponding to the two adjacent first grayscales. In a coordinate system formed by grayscales and grayscale voltage values, a connecting line formed by sequentially connecting the grayscale voltage values corresponding to the plurality of second grayscales is nonlinear. The third processing unit is configured to obtain a set of correspondences according to the plurality of grayscales and a plurality of grayscale voltage values corresponding to the plurality of grayscales. The set of correspondences includes the plurality of grayscales and a plurality of register values in a one-to-one correspondence with the plurality of grayscales, and each register value is configured to represent a grayscale voltage value of a respective grayscale.

In yet another aspect, an apparatus for obtaining correspondences between grayscales and grayscale voltages is provided. The apparatus includes a storage device and a processing device. The processing device is coupled to the storage device. The storage device stores therein one or more computer programs. When the processing device execute the one or more computer programs, the processing device performs: obtaining grayscale voltage values corresponding to at least two first grayscales in a plurality of grayscales, the plurality of grayscales further including a plurality of second grayscales between two adjacent first grayscales; obtaining grayscale voltage values in a one-to-one correspondence with the plurality of second grayscales between the two adjacent first grayscales according to the two adjacent first grayscales and grayscale voltage values corresponding to the two adjacent first grayscales, in a coordinate system formed by grayscales and grayscale voltage values, a connecting line formed by sequentially connecting the grayscale voltage values corresponding to the plurality of second grayscales being nonlinear; and obtaining a set of correspondences according to the plurality of grayscales and a plurality of grayscale voltage values corresponding to the plurality of grayscales, the set of correspondences including the plurality of grayscales and a plurality of register values in a one-to-one correspondence with the plurality of grayscales, and each register value being used to represent a grayscale voltage value of a respective grayscale.

In some embodiments, the plurality of grayscales are $2^N$ grayscales, and N is a positive integer greater than or equal to 6.

In some embodiments, the processing device further performs: for any first grayscale, measuring an actual brightness of a display panel when sub-pixels of a color in the display panel displays the first grayscale; and in a case where the actual brightness of the display panel reaches a target brightness of the first grayscale, taking a measured value of a driving voltage corresponding to the sub-pixels of the color in the display panel as a grayscale voltage value corresponding to the first grayscale.

In some embodiments, the processing device further performs: performing a nonlinear interpolation according to the two adjacent first grayscales and the grayscale voltage values corresponding to the two adjacent first grayscales to obtain the grayscale voltage values corresponding to the plurality of second grayscales between the two adjacent first grayscales.

In yet another aspect, a non-transitory computer-readable storage medium is provided. The computer-readable storage medium stores a computer program that, when runs on a computer, causes the computer to perform the obtaining method as described in any of the above embodiments.

In yet another aspect, a computer program product is provided. The computer program product includes a computer program that, when executed on a computer, causes the computer to perform the obtaining method as described in any of the above embodiments.

In yet another aspect, a computer program is provided. When executed on a computer, the computer program causes the computer to perform the method as described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, but are not limitations on an actual size of a product, an actual process of a method and an actual timing of a signal to which the embodiments of the present disclosure relate.

FIG. 3 is a schematic diagram showing a set of correspondences, in accordance with some embodiments;

FIG. 4 is a schematic diagram showing three sets of correspondences, in accordance with some embodiments;

DETAILED DESCRIPTION

Figure 1:
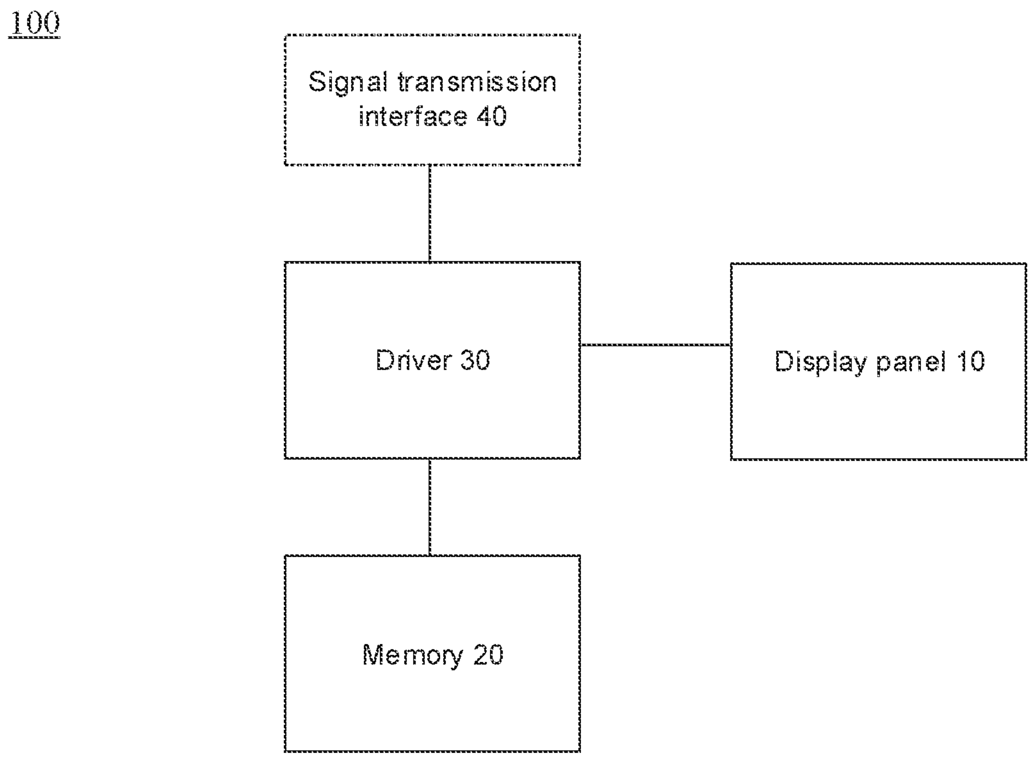
FIG. 1 is a structural diagram of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of", "the plurality of" or "multiple" means two or more unless otherwise specified. In the description of some embodiments, the terms such as "coupled" and "connected" and derivatives thereof may be used. For example, the term "connected" may be used when describing some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

Terms such as "about" or "approximately" as used herein includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

In a production process of a display apparatus, due to uncertainties in a semiconductor manufacturing process, gamma correction is required during a display process of the display apparatus. Some fixed grayscales may be preset, then brightness when the fixed grayscales are displayed may be corrected by adjusting grayscale voltages of the fixed grayscales, and then grayscale voltages of all grayscales are obtained through the corrected grayscale voltages of the fixed grayscales. For example, the grayscale voltages of all the grayscales are obtained by performing a linear interpolation (or linear division) on the grayscale voltages of the fixed grayscales. However, in the display process, an error between an actual brightness value when a grayscale is displayed and a theoretical brightness value is large (e.g., greater than 5%), which makes a relationship between the displayed grayscale and brightness deviate from a gamma curve, resulting in a reduction in an effect of the display apparatus.

Some embodiments of the present disclosure provide a display apparatus. For example, the display apparatus may be any apparatus that displays an image whether in motion (e.g., a video) or stationary (e.g., a static image), and whether literal or graphical. For example, the display apparatus may be one of a variety of electronic devices, and the described embodiments may be implemented in or associated with the variety of electronic devices. The variety of electronic devices are, for example (but not limit to), mobile telephones, wireless devices, personal data assistants (PADs), hand-held or portable computers, global positioning system (GPS) receivers/navigators, cameras, MPEG-4 Part 14 (MP4) video players, video cameras, game consoles, watches, clocks, calculators, TV monitors, flat-panel displays, computer monitors, automobile displays (e.g., odometer displays), navigators, cockpit controllers and/or displays, camera view displays (e.g., displays of rear-view cameras in vehicles), electronic photos, electronic billboards or signs, projectors, architectural structures, packaging and aesthetic structures (e.g., a display for an image of a piece of jewelry), etc. The embodiments of the present disclosure do not particularly limit a specific form of the display apparatus.

As shown in FIG. 1, the display apparatus 100 includes a display panel 10, a memory 20, and a driver 30. The driver 30 is coupled to the memory 20, a signal transmission interface 40, and the display panel 10.

For example, the display panel 10 may include a liquid crystal display (LCD) panel or a self-luminescent display panel, such as a display panel based on organic light-emitting diodes (OLEDs), a display panel based on active matrix organic light-emitting diodes (AMOLEDs), or a display panel based on light-emitting diodes (LEDs).

Figure 2:
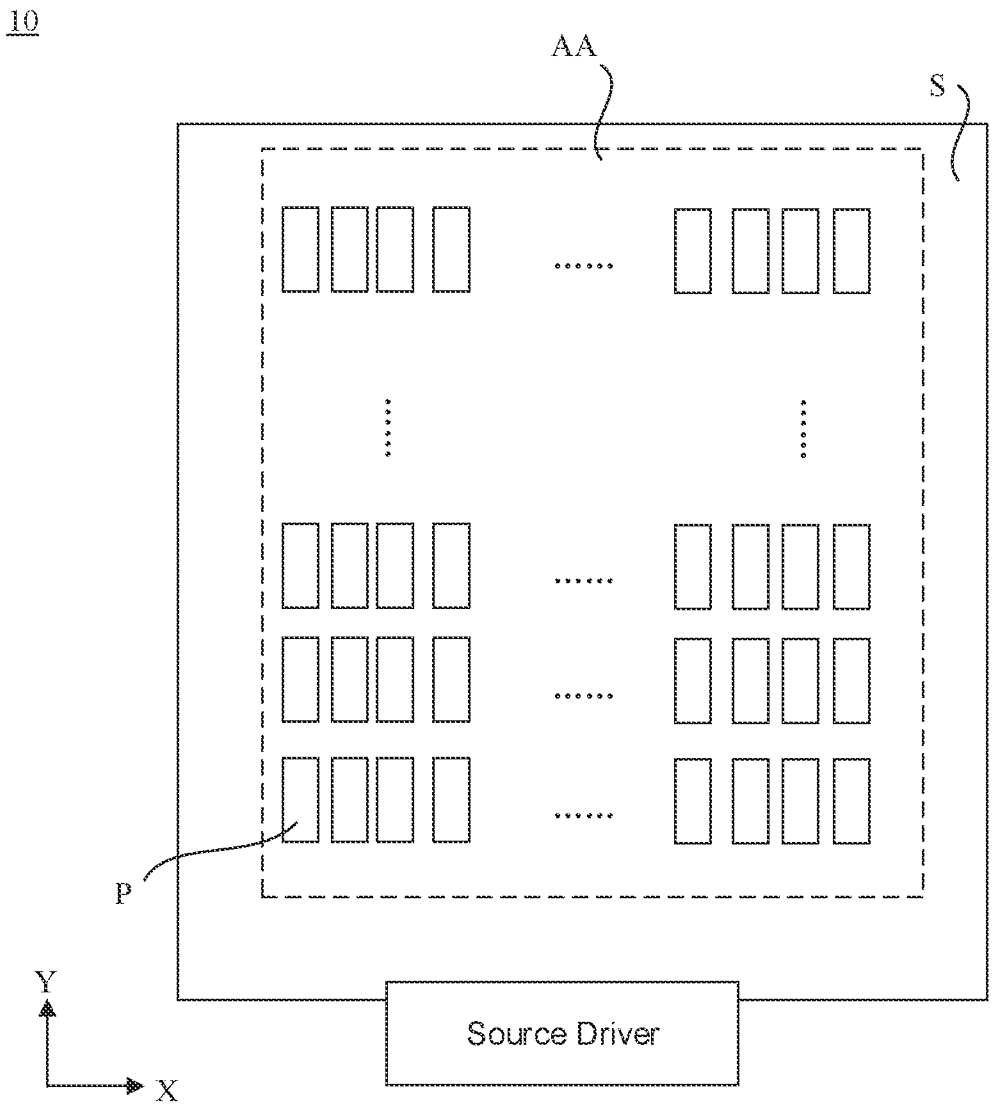
FIG. 2 is a structural diagram of a display panel, in accordance with some embodiments.

For example, as shown in FIG. 2, the display panel 10 has a display area (i.e., an active area, AA) and a peripheral region S. The peripheral region S is located on at least one side of the AA. The display panel 10 includes a plurality of sub-pixels P. The plurality of sub-pixels P are disposed in the AA. For example, the plurality of sub-pixels P may be arranged in an array. For example, sub-pixels arranged in a row in an X direction (i.e., a horizontal direction) in FIG. 2 are referred to as sub-pixels in a row, and sub-pixels arranged in a column in a Y direction (i.e., a vertical direction) in FIG. 2 are referred to as sub-pixels in a column.

For example, the plurality of sub-pixels P include sub-pixels of a first color, sub-pixels of a second color, and sub-pixels of a third color. For example, the first color, the second color, and the third color are three primary colors. For example, the first color, the second color, and the third color are red, green, and blue, respectively. That is, the plurality of sub-pixels P include red sub-pixels, green sub-pixels, and blue sub-pixels.

For example, the signal transmission interface 40 may be an interface of the display apparatus 100 for signal transmission with an external device. Alternatively, the signal transmission interface 40 may be an interface for signal transmission between various internal devices of the display apparatus 100. For example, the signal may be a video signal or an image signal. For example, the signal transmission interface 40 may include a mobile industry processor interface (MIPI), a low-voltage differential signaling (LVDS) interface, a serial digital interface (SDI), a high definition multimedia interface (HDMI), a display port (DP), or the like.

The memory 20 is configured to store at least one set of correspondences. Each set of correspondences includes $2^N$ grayscale data and $2^N$ register values in a one-to-one correspondence with the $2^N$ grayscale data. Each register value is used to represent a grayscale voltage value of respective grayscale data.

N is a positive integer greater than or equal to 6. For example, N is 8 or 10. For example, in a case where N is 8, each set of correspondences includes 28 (i.e., 256) grayscale data and 28 (i.e., 256) register values in a one-to-one correspondence with the 28 grayscale data. For example, referring to FIG. 3, in a case where N is 8, a set of correspondences includes 256 grayscale data ($F_0$, $F_1$, $F_2$, $F_3$, $F_4$ . . . $F_{255}$), and 256 register values ($H_0$, $H_1$, $H_2$, $H_3$, $H_4$ . . . $H_{255}$) in a one-to-one correspondence with the 256 grayscale data. For example, the $2^N$ grayscale data may correspond to all the grayscales of the display panel 10. For example, in a case where all the grayscales of the display panel 10 are 256 grayscales, N is 8. That is, there are 256 grayscale data in a set of correspondences.

For example, the memory 20 may be a non-volatile memory. In this way, when a power supply is cut off (that is, the power is off), the driver 30 is, for example, in a sleep mode, and the memory 20 can still retain data. For example, the non-volatile memory may include a flash read only memory (Flash ROM). Those skilled in the art may select different types of memories according to actual situations, such that the memory 20 can store at least one set of correspondences.

For example, there may also exist a storage space in the driver 30, but the storage space in the driver 30 is much smaller than a storage space in the memory 20. Therefore, compared to the driver 30, the memory 20 may store more grayscale data and register values corresponding to the grayscale data. For example, if some fixed grayscales are preset in the display apparatus 100, brightness of each grayscale of the display panel 10 may be calibrated by calibrating display brightness values (DBVs) of brightness when the fixed grayscales are displayed by the display panel 10. If the number of some fixed grayscales is 11, and there may exist 256 grayscale data in a set of correspondences, and the at least one set of correspondences includes three sets of correspondences, and a bit width of a color of a sub-pixel is 9 bits, then the storage space required for the three sets of correspondences is (11×256×3×9 bits=76032 bits). In this case, an amount of data in the correspondences is large, which cannot be satisfied by the storage space in the driver 30. Therefore, the correspondences may be stored in the memory 20.

The driver 30 is configured to: obtain the at least one set of correspondences from the memory 20; receive image data from the signal transmission interface 40, the image data including a plurality of grayscale data corresponding to the plurality of sub-pixels P; for any grayscale data in the image data, obtain a register value corresponding to the grayscale data from a set of correspondences; and output, according to the register value, a grayscale voltage corresponding to a grayscale voltage value to a sub-pixel of the display panel 10.

For example, the driver 30 may be a driver integrated circuit (IC). For example, referring to FIG. 2, the display panel 10 further includes a source driver (source IC). The driver IC transmits grayscale voltages to the display panel 10. The source driver may transmit data signals to the plurality of sub-pixels P of the display panel 10 according to the grayscale voltages. The sub-pixels perform grayscale display according to the received data signals.

In this case, during a display process of the display apparatus 100, for a grayscale data, a register value corresponding to the grayscale data may be obtained according to the at least one set of correspondences, and a grayscale voltage value, corresponding to the grayscale data, represented by the register value may be obtained according to the register value, so that a grayscale voltage corresponding to the grayscale voltage value is output to the display panel 10. As a result, when a sub-pixel displays the grayscale according to the grayscale voltage, an error between a displayed actual brightness value and a theoretical brightness value is small, which is more in line with a gamma curve, so that a display effect is improved and a correction of the display of the grayscale is realized. Moreover, in the display process, a grayscale voltage value corresponding to each grayscale may be determined through the at least one set of correspondences, that is, grayscale voltage values corresponding to all the grayscales of the display panel 10 may be obtained. Compared to a case where a grayscale voltage of each grayscale is obtained after a linear interpolation is performed on the grayscale voltages of several fixed grayscales, the grayscales and brightness displayed by the display panel 10 are more in line with the gamma curve, and a display deviation is avoided.

Therefore, in the display apparatus 100 provided by the embodiments of the present disclosure, the memory 20 stores the at least one set of correspondences, and each set of correspondences includes the $2^N$ grayscale data and the $2^N$ register values in a one-to-one correspondence with the $2^N$ grayscale data. Each register value may represent a grayscale voltage value of respective grayscale data. The driver 30 obtains the at least one set of correspondences from the memory 20, and receives the image data from the signal transmission interface 40. The image data include the plurality of grayscale data corresponding to the plurality of sub-pixels P. For any grayscale data in the image data, the driver 30 obtains a register value corresponding to the grayscale data from a set of correspondences, and outputs a grayscale voltage corresponding to a grayscale voltage value to a sub-pixel of the display panel 10 according to the register value. In this way, in the display process of the display apparatus 100, for a grayscale data, a register value corresponding to the grayscale data may be obtained according to the at least one set of correspondences, and a grayscale voltage value, corresponding to the grayscale data, represented by the register value is obtained according to the register value, so as to output the grayscale voltage corresponding to the grayscale voltage value to the display panel 10. As a result, when the sub-pixel displays the grayscale according to the grayscale voltage, the error between the displayed actual brightness value and the theoretical brightness value is small, which is more in line with the gamma curve, so that the display effect is improved and the correction of the display of the grayscale is realized.

In some embodiments, the at least one set of correspondences includes three sets of correspondences. The three sets of correspondences are respectively used for obtaining of grayscale voltage values of the sub-pixels of the first color, the sub-pixels of the second color, and the sub-pixels of the third color in the display panel 10. For example, referring to FIG. 4, the three sets of correspondences are a first set of correspondences, a second set of correspondences, and a third set of correspondences. The first set of correspondences is used for obtaining of grayscale voltage values of the sub-pixels of the first color in the display panel 10. For example, referring to FIG. 4, in a case where N is 8, the first set of correspondences includes 256 grayscale data ($RF_0$, $RF_1$, $RF_2$, $RF_3$, $RF_4$ . . . $RF_{255}$), and 256 register values ($RH_0$, $RH_1$, $RH_2$, $RH_3$, $RH_4$ . . . $RH_{255}$) in a one-to-one correspondence with the 256 grayscale data. The second set of correspondences is used for obtaining of grayscale voltage values of the sub-pixels of the second color in the display panel 10. For example, referring to FIG. 4, in a case where N is 8, the second set of correspondences includes 256 grayscale data ($GF_0$, $GF_1$, $GF_2$, $GF_3$, $GF_4$ . . . $GF_{255}$), and 256 register values ($GH_0$, $GH_1$, $GH_2$, $GH_3$, $GH_4$ . . . $GH_{255}$) in a one-to-one correspondence with the 256 grayscale data. The third set of correspondences is used for obtaining of grayscale voltage values of the sub-pixels of the third color in the display panel 10. For example, referring to FIG. 4, in a case where N is 8, the third set of correspondences includes 256 grayscale data ($BF_0$, $BF_1$, $BF_2$, $BF_3$, $BF_4$ . . . $BF_{255}$), and 256 register values ($BH_0$, $BH_1$, $BH_2$, $BH_3$, $BH_4$ . . . $BH_{255}$) in a one-to-one correspondence with the 256 grayscale data.

The driver 30 is further configured to: determine, for any grayscale data in the image data, a color of a sub-pixel corresponding to the grayscale data; determine a set of correspondences from the three sets of correspondences according to the color of the sub-pixel, the determined set of correspondences being used for obtaining of grayscale voltage values of sub-pixels, having a same color as the sub-pixel, in the sub-pixels of the first color, the sub-pixels of the second color, and the sub-pixels of the third color; and obtain a register value corresponding to the grayscale data from the determined set of correspondences.

For example, the three sets of correspondences are the first set of correspondences, the second set of correspondences, and the third set of correspondences. The first set of correspondences is used for the obtaining of the grayscale voltage values of the sub-pixels of the first color that have the same color as the sub-pixel, the second set of correspondences is used for the obtaining of the grayscale voltage values of the sub-pixels of the second color that have the same color as the sub-pixel, and the third set of correspondences is used for the obtaining of the grayscale voltage values of the sub-pixels of the third color that have the same color as the sub-pixel. In this case, for the sub-pixels of the first color, the first set of correspondences is determined from the three sets of correspondences, and then according to any grayscale data of the sub-pixels of the first color, a register value corresponding to the grayscale data is obtained from the first set of correspondences, so that a grayscale voltage corresponding to a grayscale voltage value represented by the register value can be output to the display panel 10. The sub-pixel of the first color may display a corresponding grayscale according to the grayscale voltage, so that the error between the actual brightness value of the displayed grayscale and the theoretical brightness value is reduced. For the sub-pixels of the second color, the second set of correspondences is determined from the three sets of correspondences, and then according to any grayscale data of the sub-pixels of the second color, a register value corresponding to the grayscale data is obtained from the second set of correspondences, so that a grayscale voltage corresponding to a grayscale voltage value represented by the register value can be output to the display panel 10. The sub-pixel of the second color may display a corresponding grayscale according to the grayscale voltage, so that the error between the actual brightness value of the displayed grayscale and the theoretical brightness value is reduced. For the sub-pixels of the third color, the third set of correspondences is determined from the three sets of correspondences, and then according to any grayscale data of the sub-pixels of the third color, a register value corresponding to the grayscale is obtained in the third set of correspondences, so that a grayscale voltage corresponding to a grayscale voltage value represented by the register value can be output to the display panel 10. The sub-pixel of the third color may display a corresponding grayscale according to the grayscale voltage, so that the error between the actual brightness value of the displayed grayscale and the theoretical brightness value is reduced. In this way, the error of the brightness displayed by the display panel 10 may be reduced, so that the displayed grayscale and brightness are more in line with the gamma curve, and the display effect is improved.

Figure 5:
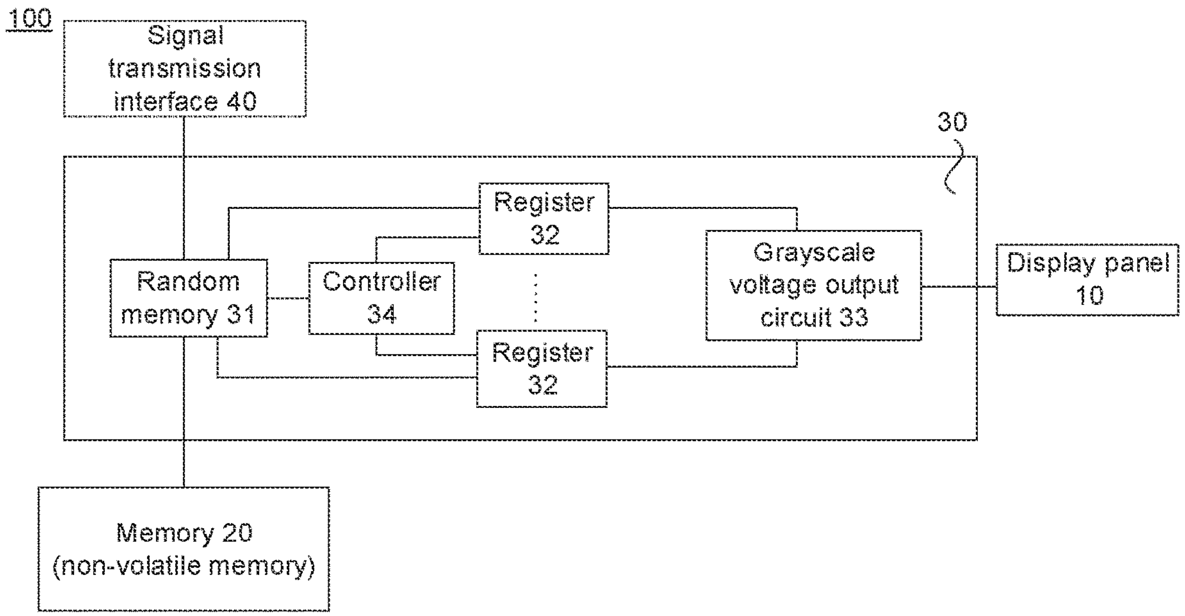
FIG. 5 is a structural diagram of another display apparatus, in accordance with some embodiments.

In some embodiments, as shown in FIG. 5, the driver 30 includes a random memory 31, a plurality of registers 32, a grayscale voltage output circuit 33, and a controller 34.

For example, the random memory 31 may include a random access memory (RAM), or a static random-access memory (SRAM). For example, the register 32 is a gamma register. For example, the register 32 includes a plurality of logic circuits. For example, a logic circuit includes a gate circuit. For example, the controller 34 may be a device with a processing function, such as a processor.

Referring to FIG. 5, the memory 20 is a non-volatile memory. The random memory 31 is coupled to the non-volatile memory (i.e., the memory). The random memory 31 is further coupled to the signal transmission interface 40. The plurality of registers 32 are coupled to the random memory 31. The controller 34 is coupled to the random memory 31 and the plurality of registers 32. The grayscale voltage output circuit 33 is coupled to the plurality of registers 32 and the display panel 10.

The random memory 31 is configured to obtain and temporarily store the at least one set of correspondences from the non-volatile memory. The random memory 31 is further configured to obtain the image data from the signal transmission interface 40. For example, the signal transmission interface 40 transmits the image data to the random memory 31, and the random memory 31 may store the image data. For example, the at least one set of correspondences and the image data are respectively stored in different storage spaces of the random memory 31. For example, in a process in which the driver 30 is awakened from a sleep state, the non-volatile memory may write the correspondences into the random memory 31 through a serial peripheral interface (SPI).

The controller 34 is configured to: control a register 32 to obtain, according to each grayscale data in the image data, a register value corresponding to the grayscale data from a set of correspondences in the random memory 31, and control the register 32 to store the register value. For example, each register 32 may obtain, according to grayscale data in the image data, a register value corresponding to the grayscale data from a set of correspondences in the random memory 31, and temporarily store the register value.

The grayscale voltage output circuit 33 is configured to output, according to the register value stored in the register 32, a grayscale voltage corresponding to a grayscale voltage value represented by the register value to the display panel 10.

For example, the random memory 31 stores therein at least one set of correspondences, and the at least one set of correspondences may include three sets of correspondences. When the image data (the image data includes a plurality of grayscale data) comes, for example, the plurality of grayscale data may be stored in the random memory 31. The controller 34 retrieves, from the at least one set of correspondences, a register value corresponding to each grayscale data (e.g., a register value corresponding to a grayscale displayed by each sub-pixel) in the image data according to the plurality of grayscale data in the image data, and the controller 34 controls a register 32 to obtain and store the register value corresponding to the grayscale displayed by the sub-pixel. For example, if the image data includes 256 grayscale data, there exist 256 corresponding registers. For grayscale data, there exists a corresponding register to obtain and temporarily store a register value corresponding to the grayscale data from a set of correspondences. The grayscale voltage output circuit 33 outputs, according to the register value stored in the register 32, a grayscale voltage corresponding to a grayscale voltage value represented by the register value to the display panel 10, so that a grayscale displayed by a sub-pixel receiving the grayscale voltage is a grayscale corresponding to grayscale data corresponding to the register value. In this way, the grayscale voltage output by the driver 30 to the display panel 10 may drive the sub-pixel to display the corresponding grayscale, and a brightness value of the displayed grayscale is close to the theoretical brightness value, so that the displayed grayscale and brightness are more in line with the gamma curve, which avoids the error of the displayed brightness, and improves the display effect.

Figure 6:
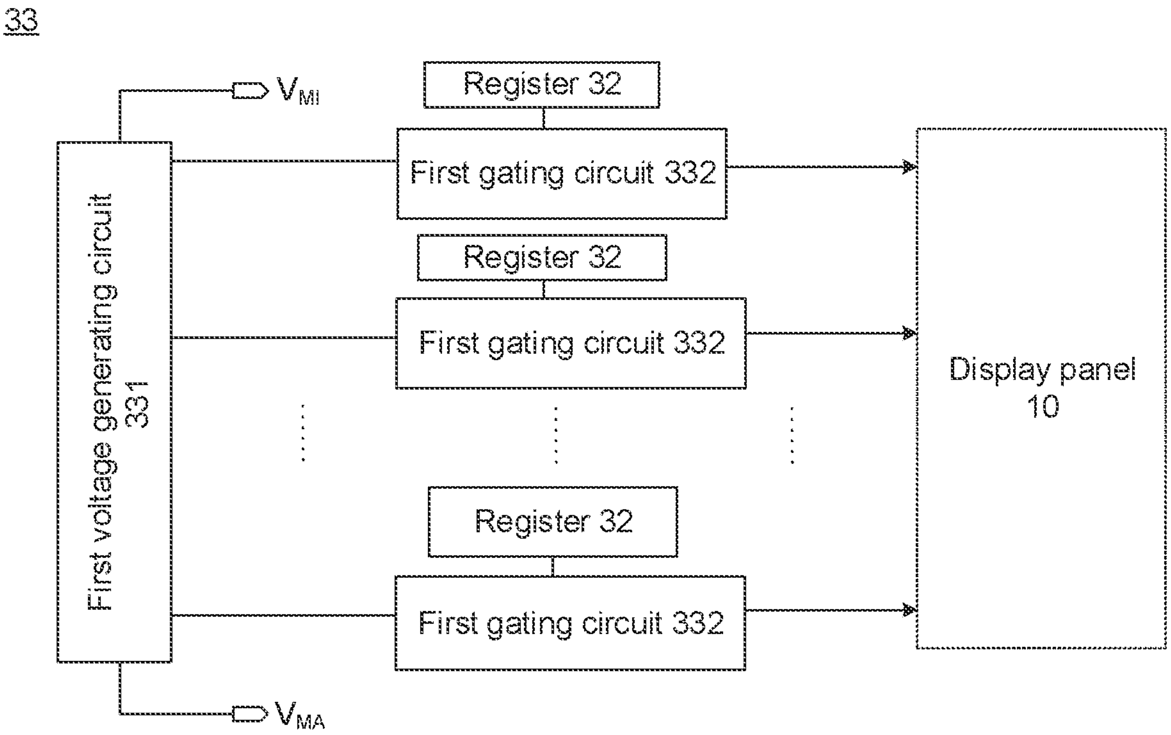
FIG. 6 is a structural diagram of a grayscale voltage output circuit, in accordance with some embodiments.

For example, as shown in FIG. 6, the grayscale voltage output circuit 33 includes a first voltage generating circuit 331 and a plurality of first gating circuits 332. The first voltage generating circuit 331 is coupled to a first voltage terminal $V_{MA}$ and a second voltage terminal $V_{MI}$. Each first gating circuit 332 is coupled to the first voltage generating circuit 331, a register 32, and the display panel 10.

The first voltage generating circuit 331 is configured to obtain a plurality of third voltages according to a first voltage of the first voltage terminal and a second voltage of the second voltage terminal. For example, the first voltage transmitted by the first voltage terminal is a direct current (DC) voltage, e.g., a DC high voltage; and the second voltage transmitted by the second voltage terminal is a DC voltage, e.g., a DC low voltage. The first voltage is greater than the second voltage. That is, an amplitude (i.e., a voltage value) of the first voltage is greater than an amplitude of the second voltage. For example, the first voltage may be a grayscale voltage corresponding to a maximum grayscale among the plurality of grayscales, and the second voltage may be a grayscale voltage corresponding to a minimum grayscale among the plurality of grayscales. For example, the first voltage generating circuit 331 may output grayscale voltages corresponding to a plurality of grayscale data between maximum grayscale data and minimum grayscale data according to a grayscale voltage corresponding to the maximum grayscale data and a grayscale voltage corresponding to the minimum grayscale data. For example, in a case where N is 8, the plurality of grayscale data are grayscale data 00000000 to 11111111, i.e., grayscales 0 to 255. The first voltage generating circuit 331 may generate a plurality of third voltages according to a grayscale voltage corresponding to the grayscale 255 (i.e., the maximum grayscale data 11111111) and a grayscale voltage corresponding to the grayscale 0 (i.e., the minimum grayscale data 00000000). The plurality of third voltages respectively correspond to a plurality of grayscale voltages corresponding to grayscales 1 to 254 (i.e., grayscale data 00000001 to grayscale data 11111110).

The first gating circuit 332 is configured to output a voltage of the first voltage, the second voltage, and the plurality of third voltages from the first voltage generating circuit 331 to the display panel 10 according to the register value stored in the register 32, and this voltage is a grayscale voltage corresponding to a grayscale voltage value represented by the register value. For example, the first gating circuit 332 may adopt a multiplexer (MUX).

For example, the first gating circuit 332 may output, according to the register value stored in the register 32, a grayscale voltage corresponding to a grayscale voltage value represented by the register value to the display panel 10. For example, in a case where the plurality of grayscale data correspond to the grayscales 0 to 255, the first gating circuit 332 may output a grayscale voltage corresponding to any of the grayscales 0 to 255 to the display panel 10, and the sub-pixel in the display panel 10 may display a corresponding grayscale according to the grayscale voltage, so as to reduce the error between the actual brightness value of the displayed grayscale and the theoretical brightness value.

Figure 7A:
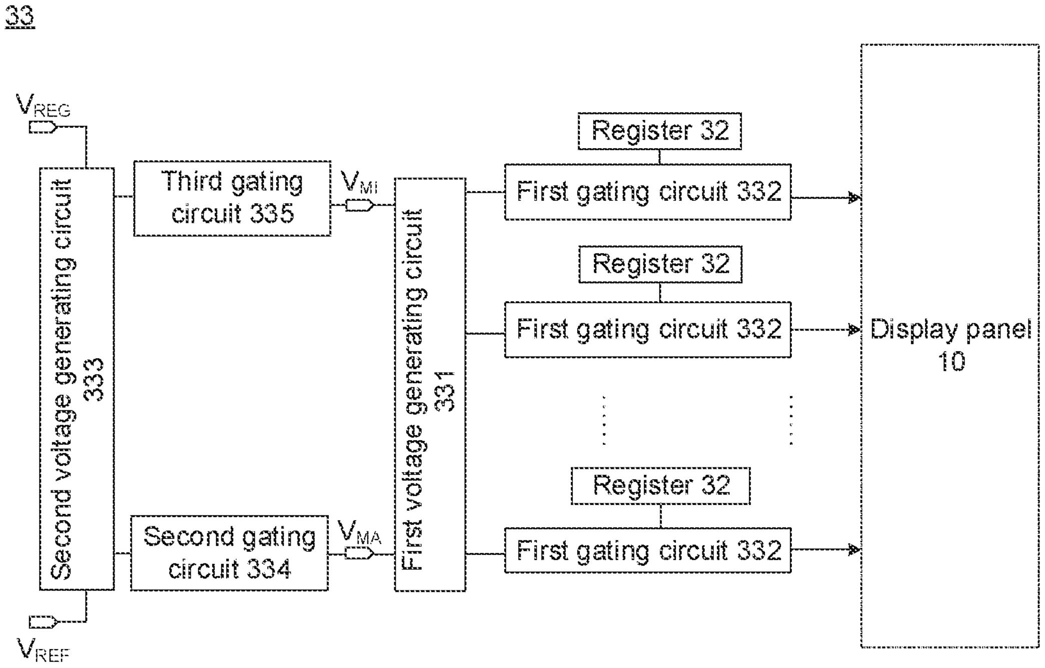
FIG. 7A is a structural diagram of another grayscale voltage output circuit, in accordance with some embodiments.

In some embodiments, as shown in FIG. 7A, the grayscale voltage output circuit 33 further includes a second voltage generating circuit 333, a second gating circuit 334, and a third gating circuit 335. The second voltage generating circuit 333 is coupled to a first reference voltage terminal $V_{REG}$ and a second reference voltage terminal $V_{REF}$. The second gating circuit 334 is coupled to the first voltage terminal $V_{MA}$ and the second voltage generating circuit 333. The third gating circuit 335 is coupled to the second voltage terminal $V_{MI}$ and the second voltage generating circuit 333. For example, the second gating circuit 334 and the third gating circuit 335 may each adopt a MUX.

For example, a first reference voltage transmitted by the first reference voltage terminal is a DC voltage, e.g., a DC high voltage. For example, a second reference voltage transmitted by the second reference voltage terminal is a DC voltage, e.g., a DC low voltage. For example, the first reference voltage is greater than the second reference voltage. That is, an amplitude of the first reference voltage is greater than an amplitude of the second reference voltage.

The second voltage generating circuit 333 is configured to obtain a plurality of divided voltages according to the first reference voltage of the first reference voltage terminal and the second reference voltage of the second reference voltage terminal.

The second gating circuit 334 is configured to output a divided voltage of the plurality of divided voltages according to the register value among the $2^N$ register values that represents the maximum grayscale voltage value, and the divided voltage is the first voltage. For example, the second gating circuit 334 is further coupled to a register 32, and the register 32 coupled to the second gating circuit 334 may obtain and temporarily store a register value among the $2^N$ register values that represents the maximum grayscale voltage value, so as to provide the register value among the $2^N$ register values that represents the maximum grayscale voltage value to the second gating circuit 334. For example, the register 32 coupled to the second gating circuit 334 and one of the plurality of registers 32 coupled to the first gating circuit 332 for obtaining and storing the register value among the $2^N$ register values that represents the maximum grayscale voltage value may be a same register. For example, in a case where N is 8, the plurality of grayscale data are grayscale data 00000000 to 11111111, i.e., the grayscales 0 to 255. The register value corresponding to the maximum grayscale data (i.e., grayscale data 11111111, i.e., the grayscale 255) may represent the maximum grayscale voltage value, and the second gating circuit 334 outputs, according to the register value corresponding to the grayscale 255, a grayscale voltage corresponding to a grayscale voltage value corresponding to the register value corresponding to the grayscale 255 from the plurality of divided voltages obtained by the second voltage generating circuit 333. That is, an amplitude of the grayscale voltage output by the second gating circuit 334 is the grayscale voltage value corresponding to the register value corresponding to the grayscale 255.

The third gating circuit 335 is configured to output a divided voltage of the plurality of divided voltages according to the register value among the $2^N$ register values that represents the minimum grayscale voltage value, and the divided voltage is the second voltage. For example, the third gating circuit 335 is further coupled to a register 32, and the register 32 coupled to the third gating circuit 335 may obtain and temporarily store a register value among the $2^N$ register values that represents the minimum grayscale voltage value, so as to provide the register value among the $2^N$ register values that represents the minimum grayscale voltage value to the third gating circuit 335. For example, the register 32 coupled to the third gating circuit 335 and one of the plurality of registers 32 coupled to the first gating circuit 332 for obtaining and storing the register value among the $2^N$ register values that represents the minimum grayscale voltage value may be a same register. For example, in a case where N is 8, the plurality of grayscale data are grayscale data 00000000 to 11111111, i.e., the grayscales 0 to 255. The register value corresponding to the minimum grayscale data (i.e., grayscale data 00000000, i.e., the grayscale 0) may represent the minimum grayscale voltage value, and the third gating circuit 335 outputs, according to the register value corresponding to the grayscale 0, a grayscale voltage corresponding to a grayscale voltage value corresponding to the register value corresponding to the grayscale 0 from the plurality of divided voltages obtained by the second voltage generating circuit 333. That is, an amplitude of the grayscale voltage output by the third gating circuit 335 is the grayscale voltage value corresponding to the register value corresponding to the grayscale 0.

In addition, the grayscale voltage output by the second gating circuit 334, which may be used as the first voltage, is transmitted to the first voltage generating circuit 331, and the grayscale voltage output by the third gating circuit 335, which may be used as the second voltage, is transmitted to the first voltage generating circuit 331. The first voltage and the second voltage are used for the first voltage generating circuit 331 to obtain the plurality of third voltages.

Figure 7B:
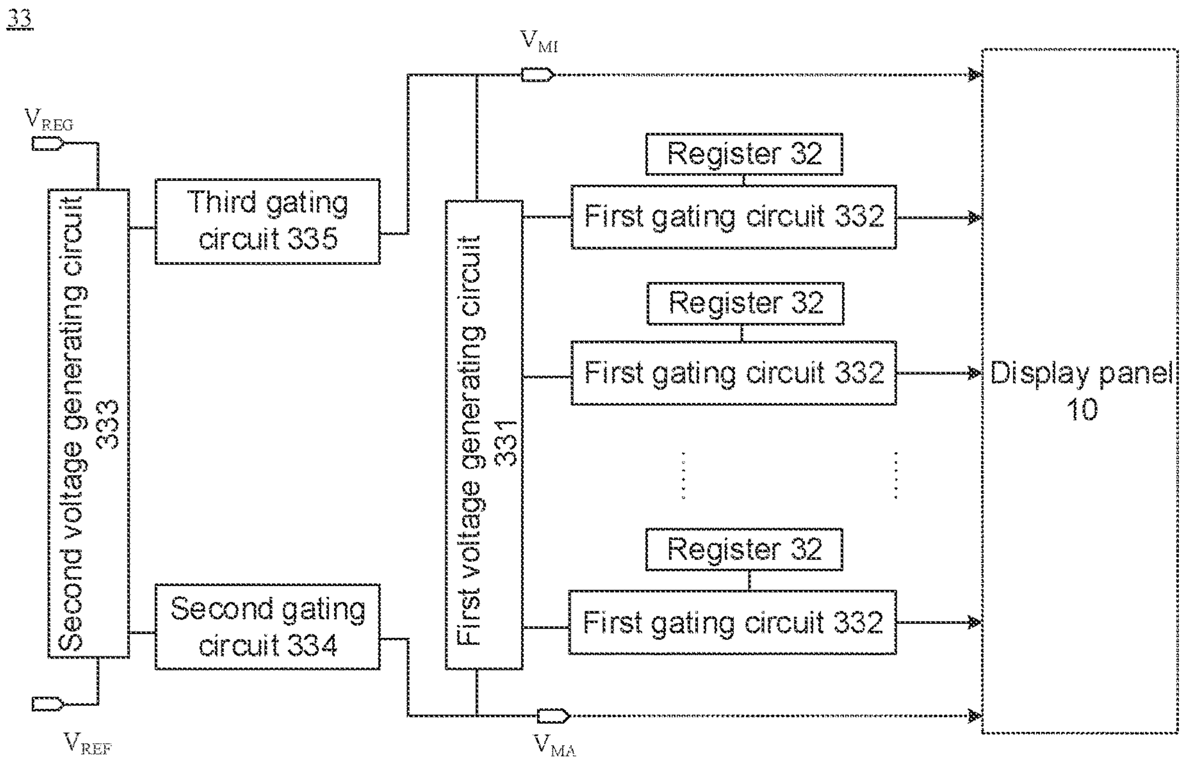
FIG. 7B is a structural diagram of yet another grayscale voltage output circuit, in accordance with some embodiments.

For example, in a case where grayscales to be displayed by the display panel 10 include the maximum grayscale and the minimum grayscale, the second gating circuit 334 and the third gating circuit 335 may output the first voltage and the second voltage to the display panel 10, respectively (referring to FIG. 7B). In this case, one of the plurality of first gating circuits 332 that is used to output the first voltage to the display panel 10 and the second gating circuit 334 may be regarded as a same gating circuit; and one of the plurality of first gating circuits 332 that is used to output the second voltage to the display panel 10 and the third gating circuit 335 may be regarded as a same gating circuit. For example, referring to FIG. 7B, for the grayscales 0 to 255, the second gating circuit 334 may output the grayscale voltage corresponding to the grayscale 255, the third gating circuit 335 may output the grayscale voltage corresponding to the grayscale 0, and the plurality of first gating circuits 332 may output grayscale voltages corresponding to the grayscales 1 to 254.

Figure 7C:
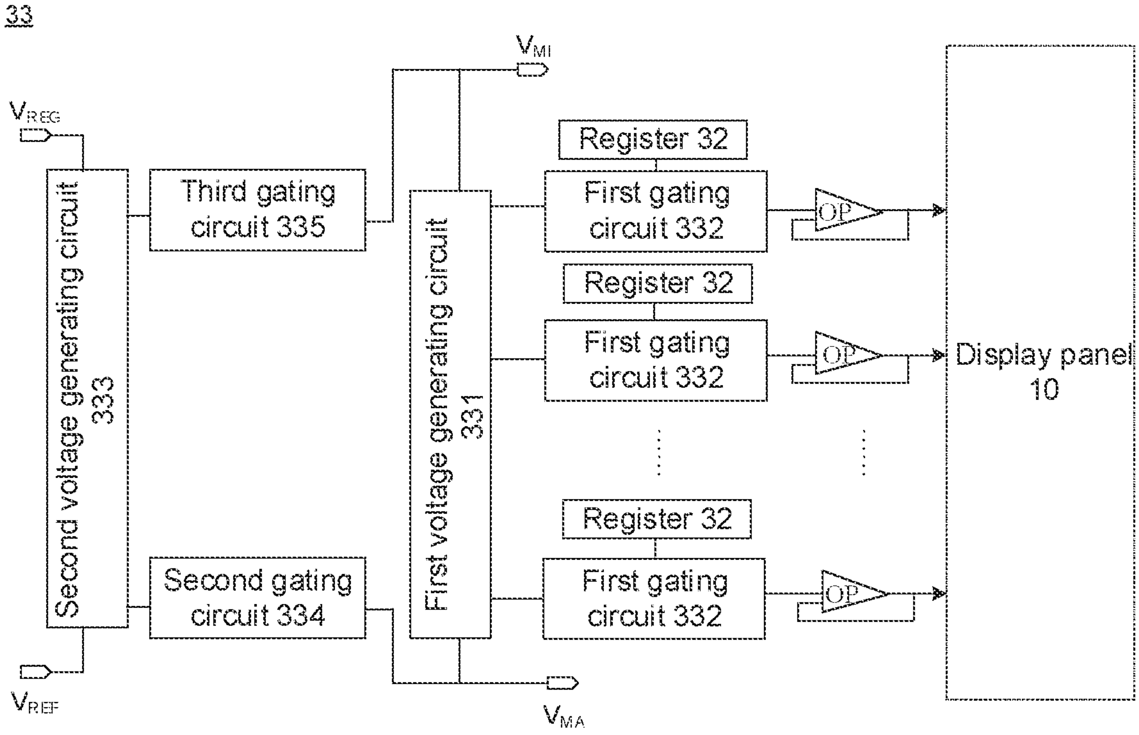
FIG. 7C is a structural diagram of yet another grayscale voltage output circuit, in accordance with some embodiments.

In addition, referring to FIG. 7C, the grayscale voltage output circuit 33 further includes a plurality of operational amplifiers OP. Each first gating circuit 332 is coupled to an operational amplifier, the second gating circuit 334 is coupled to an operational amplifier, and the third gating circuit 335 is coupled to an operational amplifier. Each operational amplifier is configured to amplify a grayscale voltage from a respective gating circuit.

Figure 8:
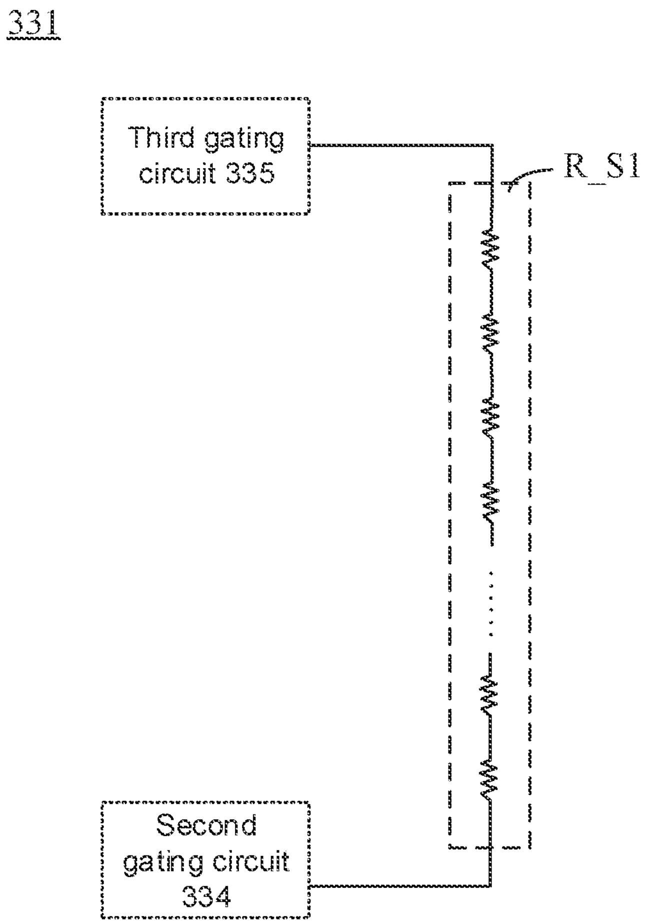
FIG. 8 is a structural diagram of a first voltage generating circuit, in accordance with some embodiments.

For example, as shown in FIG. 8, the first voltage generating circuit 331 includes a first resistor string R_S1. Both ends of the first resistor string R_S1 are respectively coupled to the second gating circuit 334 and the third gating circuit 335. For example, the second gating circuit 334 is coupled to the first voltage terminal, and the third gating circuit 335 is coupled to the second voltage terminal. Therefore, both ends of the first resistor string are respectively coupled to the first voltage terminal and the second voltage terminal. In this way, both ends of the first resistor string receive the first voltage and the second voltage, respectively, so that the first resistor string may perform voltage division according to the first voltage and the second voltage.

Figure 9:
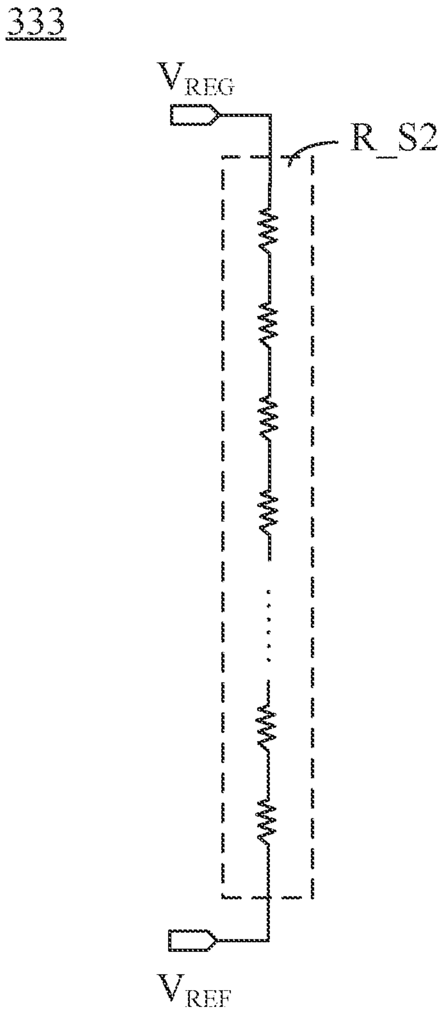
FIG. 9 is a structural diagram of a second voltage generating circuit, in accordance with some embodiments.

For example, as shown in FIG. 9, the second voltage generating circuit 333 includes a second resistor string R_S2. Both ends of the second resistor string R_S2 are respectively coupled to the first reference voltage terminal $V_{REG}$ and the second reference voltage terminal $V_{REF}$. In this way, both ends of the second resistor string receive the first reference voltage and the second reference voltage, respectively, so that the second resistor string may perform voltage division according to the first reference voltage and the second reference voltage.

For example, a grayscale and a corresponding grayscale voltage value satisfy a formula: $V_x=A\times G_x^{\beta}+B$. The grayscale is an analog value of grayscale data. $V_x$ represents the grayscale voltage value, $G_x$ represents the grayscale, β represents a preset parameter, and A and B represent scale factors.

The grayscale data may be represented by a binary number, and the analog value of the grayscale data may be understood as a decimal number of the grayscale data. For example, in a case where the number of bits of the grayscale data is 8, analog values of 256 grayscale data from 00000000 to 11111111 are respectively 0 to 255, i.e., the grayscales 0 to 255. For example, the grayscale 0 is an analog value of the grayscale data 00000000, and the grayscale 255 is an analog value of the grayscale data 11111111.

For example, the preset parameter is in a range of −0.1 to 2.4, inclusive. That is, β is equal to any value of −0.1 to 2.4. For example, the preset parameter β may be 0.1, 0.5, 1.1, 1.5, or 2.2. A specific value of the preset parameter may be selected according to actual situations, which is not limited herein. For example, the scale factors A and B are not equal, and both A and B are related to the preset parameter β.

For example, the plurality of grayscales include at least two first grayscales and a plurality of second grayscales existing between two adjacent first grayscales in the at least two first grayscales. A second grayscale, a grayscale voltage value corresponding to the second grayscale and the two adjacent first grayscales and grayscale voltage values corresponding to the two adjacent first grayscales satisfy a formula:

$$V_3=\frac{(V_1-V_2)}{(G_1^{\beta}-G_2^{\beta})}\times G_3^{\beta}-\frac{(V_1-V_2)}{(G_1^{\beta}-G_2^{\beta})}\times G_1^{\beta}+V_1;$$

where $V_3$ represents the grayscale voltage value corresponding to the second grayscale, $V_2$ and $V_1$ respectively represent the grayscale voltage values corresponding to the two adjacent first grayscales, $G_3$ represents the second grayscale, $G_2$ and $G_1$ represent the two adjacent first grayscales, and β represents the preset parameter. In this way, the scale factor A may be $$\frac{(V_1-V_2)}{(G_1^{\beta}-G_2^{\beta})},$$

and the scale factor B may be $$\left(V_1-\frac{(V_1-V_2)}{(G_1^{\beta}-G_2^{\beta})}\times G_1^{\beta}\right).$$

For example, if the two adjacent first grayscales are the maximum grayscale and the minimum grayscale (for example, among the plurality of grayscales, the maximum grayscale is grayscale $G_{MAX}$, and the minimum grayscale is grayscale $G_{MIN}$), a grayscale voltage value corresponding to the maximum grayscale is $V_{MAX}$, and a grayscale voltage value corresponding to the minimum grayscale is $V_{MIN}$. In this way, a grayscale voltage value $V_i$ of each second grayscale $G_i$ between the maximum grayscale and the minimum grayscale may be expressed as $$V_i=\frac{(V_{MAX}-V_{MIN})}{(G_{MAX}^{\beta}-G_{MIN}^{\beta})}\times G_i^{\beta}-\frac{(V_{MAX}-V_{MIN})}{(G_{MAX}^{\beta}-G_{MIN}^{\beta})}\times G_{MIN}^{\beta}+V_{MAX},$$

i is a positive integer, and a value of i may be taken continuously in an interval from the minimum grayscale to the maximum grayscale. For example, among the 256 grayscales, the maximum grayscale is the grayscale 255, and the minimum grayscale is the grayscale 0. The grayscale voltage value corresponding to the grayscale 255 is a voltage value $V_{M1}$ of the first voltage of the first voltage terminal $V_{MA}$, and the grayscale voltage value corresponding to the grayscale 0 is a voltage value $V_{M2}$ of the second voltage of the second voltage terminal $V_{MI}$. In this way, a grayscale voltage value corresponding to any of the grayscales 1 to 254 may be expressed as $$V_i=\frac{(V_{M1}-V_{M2})}{(255^{\beta}-0^{\beta})}\times G_i^{\beta}-\frac{(V_{M1}-V_{M2})}{(255^{\beta}-0^{\beta})}\times 0^{\beta}+V_{M1},$$

where i is in a range of 1 to 254, inclusive. The scale factor A may be $$\frac{(V_{M1}-V_{M2})}{(255^{\beta}-0^{\beta})},$$

and the scale factor B may be $$\left(V_{M1} - \frac{(V_{M1} - V_{M2})}{(255^{\beta} - 0^{\beta})} \times 0^{\beta}\right).$$

For example, the scale factor A is $$\frac{(V_{M1} - V_{M2})}{255^{\beta}},$$

and the scale factor B is $V_{M1}$.

Embodiments of the present disclosure provide a method for obtaining correspondences between grayscales and grayscale voltages. For example, the at least one set of correspondences stored in the memory of the display apparatus described in any of the above embodiments may be obtained through the method.

Figure 10:
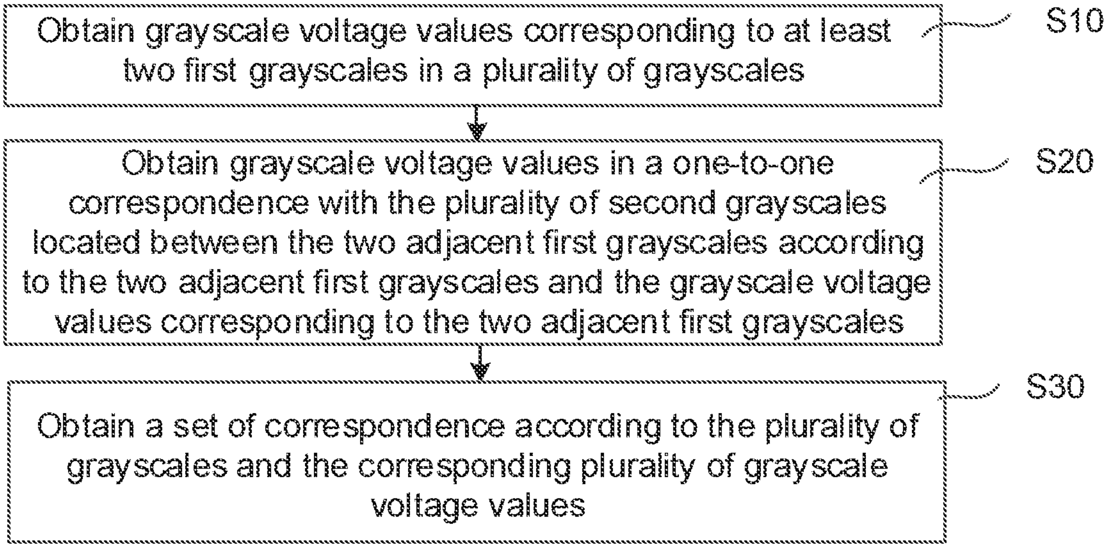
FIG. 10 is a flow diagram of a method for obtaining a correspondence between a grayscale and a grayscale voltage, in accordance with some embodiments.

Referring to FIG. 10, the method includes following steps.

In S10, grayscale voltage values corresponding to at least two first grayscales in a plurality of grayscales are obtained.

For example, the plurality of grayscales are $2^N$ grayscales, and N is a positive integer greater than or equal to 6. For example, N is 8 or 10. For example, in a case where N is 8, the plurality of grayscales are 256 grayscales. For example, the 256 grayscales are grayscales 0 to 255.

There exist a plurality of second grayscales between two adjacent first grayscales in the at least two first grayscales. For example, the at least two first grayscales may include a maximum grayscale and a minimum grayscale. For example, in a case where the at least two first grayscales include two first grayscales, the two first grayscales are two adjacent first grayscales, e.g., the maximum grayscale and the minimum grayscale, and the maximum grayscale and the minimum grayscale are the two adjacent first grayscales. For example, in a case where the plurality of grayscales are 256 grayscales including the grayscales 0 to 255, the two first grayscales are the grayscale 0 and the grayscale 255, and the grayscale 0 and the grayscale 255 are two adjacent first grayscales. For example, in a case where the at least two first grayscales include more than two first grayscales, the more than two first grayscales include the maximum grayscale, the minimum grayscale, and at least one grayscale between the maximum grayscale and the minimum grayscale. The number and position of the at least one grayscale may be designed according to actual situations, which is not limited herein. For example, the number of the at least two first grayscales may be 9 to 40. For example, it may be 11, 15 or 20. There exist a plurality of second grayscales between two adjacent first grayscales. For example, the number of the plurality of second grayscales is two or more. For example, the number of the plurality of second grayscales between the two adjacent first grayscales may not be equal.

The grayscale refers to an analog value of grayscale data, the grayscale data is expressed in a binary number, and the grayscale is expressed in a decimal number. For example, the grayscale data is 00000000, its analog value is 0, that is, the grayscale is 0; the grayscale data is 00000001, and its analog value is 1, that is, the grayscale is 1; the grayscale data is 11111111, and its analog value is 255, that is, the grayscale is 255. The grayscale voltage value corresponding to the grayscale refers to an amplitude of a grayscale voltage (e.g., the grayscale voltage may be regarded as a transmitted voltage signal) corresponding to the grayscale, and the grayscale voltage value is a value with a physical unit. For example, a grayscale voltage value corresponding to the grayscale 0 is 0 V.

For example, that the grayscale voltage values corresponding to the at least two first grayscales in the plurality of grayscales are obtained includes: for any first grayscale, measuring an actual brightness of a display panel when sub-pixels of a color in the display panel display the first grayscale; and in a case where the actual brightness of the display panel reaches a target brightness of the first grayscale, taking a measured value of a driving voltage corresponding to the sub-pixels of the color in the display panel as a grayscale voltage value corresponding to the first grayscale.

For example, for any first grayscale, in a case where sub-pixels of a color (e.g., sub-pixels of a color in the sub-pixels of the first color, the sub-pixels of the second color, and the sub-pixels of the third color) in the display panel display the first grayscale, the value of the driving voltage corresponding to the sub-pixels is obtained, and the actual brightness of the display panel is measured. By adjusting the value (i.e., an amplitude) of the driving voltage corresponding to the sub-pixels, the actual brightness of the display panel is adjusted accordingly. In a case where the actual brightness of the display panel when it displays the first grayscale reaches the target brightness of the first grayscale, the measured value of the driving voltage corresponding to the sub-pixels is taken as the grayscale voltage value corresponding to the first grayscale. In this way, a relationship between the first grayscale and the grayscale voltage value corresponding to the first grayscale may be obtained, that is, a relationship between the first grayscale and a grayscale voltage corresponding to the first grayscale is obtained.

For example, according to a relational expression $$L_j = \left(\frac{G_j}{G_{MAX}}\right)^{GAM} \times L_{MAX}$$

between a grayscale $G_j$, its corresponding brightness value $L_j$, and a gamma value GAM, a brightness value of a sub-pixel of a color at a grayscale may be obtained as a theoretical brightness value at the grayscale. In a case where the brightness value of the display panel when it displays the grayscale reaches the theoretical brightness value, it may be considered that the actual brightness when the grayscale is displayed reaches the target brightness. Where GAM is the gamma value, $G_{MAX}$ is the maximum grayscale, $G_j$ is a j-th grayscale, $L_{MAX}$ is a brightness value corresponding to the maximum grayscale $G_{MAX}$, $L_j$ is a brightness value corresponding to the j-th grayscale, and j is an integer. For example, the gamma value GAM is 2.2, a value of the grayscale $G_j$ is any one of 0 to 255, j is greater than or equal to 0, and is less than or equal to 255 ($0 \leq j \leq 255$), and $G_{MAX}$ is 255. For example, the brightness value corresponding to the maximum grayscale may be the brightness value measured when the brightness value reaches the maximum when the display apparatus displays the maximum grayscale.

It will be noted that in a case where the plurality of sub-pixels include sub-pixels of a first color, sub-pixels of a second color, and sub-pixels of a third color, for each color, a set of correspondences between the first grayscales and the grayscale voltages corresponding to the first grayscales may be measured. That is, three sets of correspondences between the first grayscales and the grayscale voltages corresponding to the first grayscales may be obtained.

In S20, grayscale voltage values in a one-to-one correspondence with second grayscales between the two adjacent first grayscales are obtained according to the two adjacent first grayscales and the grayscale voltage values corresponding to the two adjacent first grayscales. In a coordinate system formed by grayscales and grayscale voltage values, a connecting line formed by sequentially connecting the grayscale voltage values corresponding to the second grayscales is nonlinear.

For example, that the grayscale voltage values in a one-to-one correspondence with the second grayscales between the two adjacent first grayscales are obtained according to the two adjacent first grayscales and the grayscale voltage values corresponding to the two adjacent first grayscales includes: performing a nonlinear interpolation according to the two adjacent first grayscales and the grayscale voltage values corresponding to the two adjacent first grayscales, so as to obtain the grayscale voltage values corresponding to the second grayscales between the two adjacent first grayscales.

Figure 11:
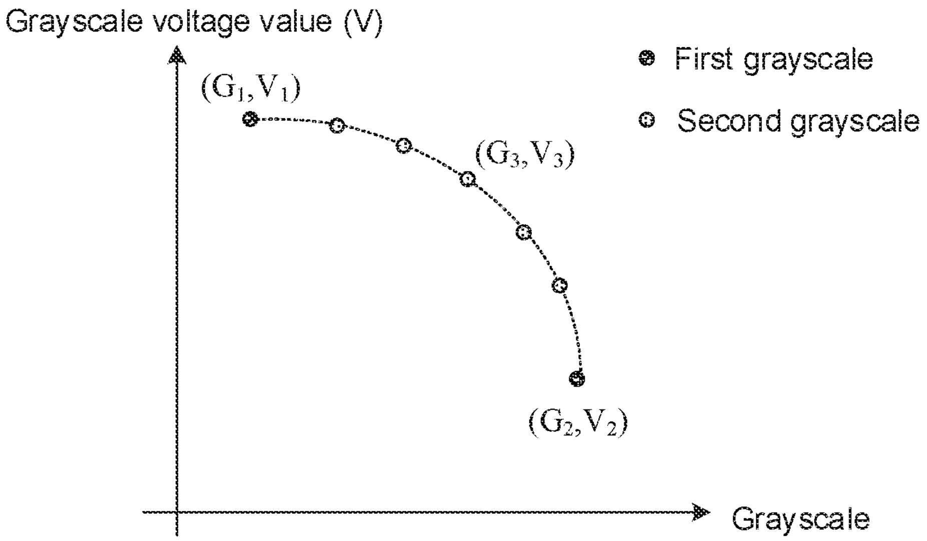
FIG. 11 is a process diagram of a method for obtaining a correspondence between a grayscale and a grayscale voltage, in accordance with some embodiments.
Figure 12:
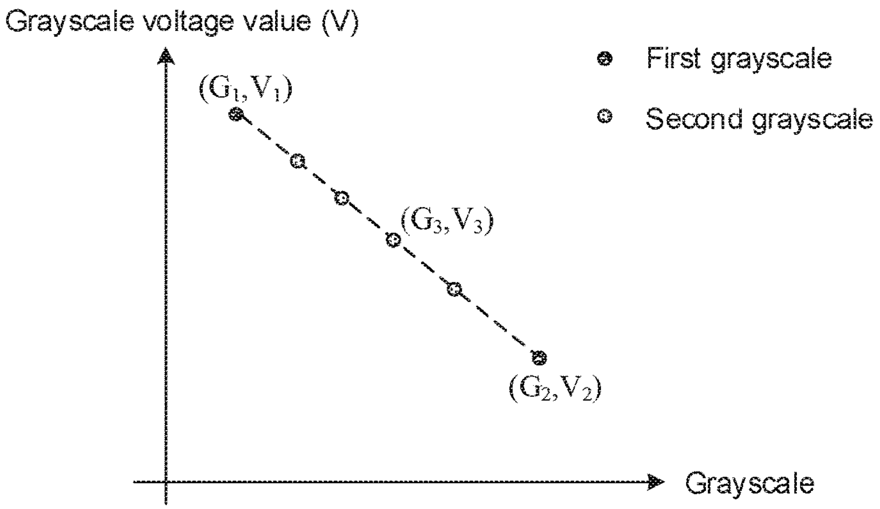
FIG. 12 is a process diagram of another method for obtaining a correspondence between a grayscale and a grayscale voltage, in accordance with some embodiments.

For example, in the coordinate system formed by grayscales and grayscale voltage values, referring to FIG. 12, if a linear interpolation is performed on the two adjacent first grayscales and their corresponding grayscale voltage values, grayscale voltage values corresponding to second grayscales between the two adjacent first grayscales are obtained, and a connecting line formed by sequentially connecting the grayscale voltage values corresponding to the second grayscales is linear. For example, the connecting line is a straight line. Referring to FIG. 11, if a nonlinear interpolation is performed on the two adjacent first grayscales and their corresponding grayscale voltage values, grayscale voltage values corresponding to the second grayscales between the two adjacent first grayscales are obtained, and a connecting line formed by sequentially connecting the grayscale voltage values corresponding to the second grayscales is nonlinear. For example, the connecting line is an arc line.

The relationship between the grayscale and the brightness is nonlinear. For example, the relationship between the grayscale and the brightness is an exponential relationship. For example, the relationship between the grayscale and the brightness conforms to a gamma curve, and the exponent is the gamma value. In addition, the relationship between the grayscale voltage (i.e., the grayscale voltage value) and the brightness is linear. Therefore, the relationship between the grayscale and the grayscale voltage value is a nonlinear relationship, e.g., the exponential relationship. Moreover, actually, the relationship between the grayscale voltage and the brightness is not completely linear. Therefore, compared with the grayscale voltage value of the second grayscale obtained by using the linear interpolation shown in FIG. 12, by transmitting a grayscale voltage corresponding to the grayscale voltage value of the second grayscale obtained by using the nonlinear interpolation shown in FIG. 11 to the display panel, the grayscale and the brightness displayed by the display panel may be more in line with the gamma curve, so that a deviation in the display brightness may be avoided.

For example, the second grayscale, the grayscale voltage value corresponding to the second grayscale and the two adjacent first grayscales and the grayscale voltage values corresponding to the two adjacent first grayscales satisfy a formula:

$$V_3 = \frac{(V_1 - V_2)}{(G_1^\beta - G_2^\beta)} \times G_3^\beta - \frac{(V_1 - V_2)}{(G_1^\beta - G_2^\beta)} \times G_1^\beta + V_1.$$

Where $V_3$ represents the grayscale voltage value corresponding to the second grayscale, $V_2$ and $V_1$ represent the grayscale voltage values corresponding to the two adjacent first grayscales, $G_3$ represents the second grayscale, $G_2$ and $G_1$ represent the two adjacent first grayscales, and β represents a preset parameter.

Figure 13:
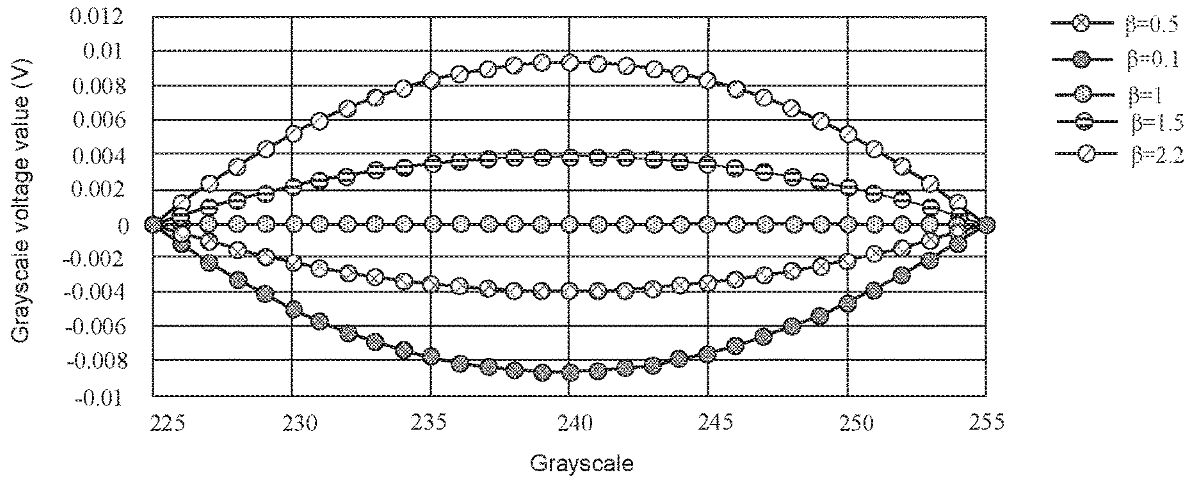
FIG. 13 is a distribution diagram of grayscale voltage values at different preset parameters, in accordance with some embodiments.

For example, the preset parameter is in a range of −0.1 to 2.4, inclusive. That is, β is equal to a value in a range from −0.1 to 2.4. For example, the preset parameter β may be 0.1, 0.5, 1.1, 1.5, or 2.2. The specific value of the preset parameter may be selected according to the actual situations, which is not limited herein. For example, referring to FIG. 13, when the preset parameter β is equal to 1 (β=1), the connecting line formed by sequentially connecting the grayscale voltage values corresponding to the grayscales is linear, e.g., a straight line. That is, the grayscale voltage values corresponding to the second grayscales are obtained by using a linear interpolation. When the preset parameter β is greater than 1 (β>1), the connecting line formed by sequentially connecting the grayscale voltage values corresponding to the grayscales is nonlinear, e.g., an arc line. That is, the grayscale voltage values corresponding to the second grayscales are obtained by using a nonlinear interpolation, and for a same grayscale, a grayscale voltage value obtained by using the nonlinear interpolation is greater than a grayscale voltage value obtained by using the linear interpolation. When the preset parameter β is less than 1 (β<1), the connecting line formed by sequentially connecting the grayscale voltage values corresponding to the grayscales is nonlinear, e.g., an arc line. That is, the grayscale voltage values corresponding to the second grayscales are obtained by using the nonlinear interpolation, and for a same grayscale, a grayscale voltage value obtained by using the nonlinear interpolation is less than a grayscale voltage value obtained by using the linear interpolation. For example, when the preset parameter β is greater than 1 (β>1), the larger the preset parameter β is, the greater a radian (i.e., a degree of bending) of the connecting line formed by sequentially connecting the grayscale voltage values corresponding to the grayscales is. When the preset parameter β is less than 1 (β<1), the smaller the preset parameter β is, the greater the radian (i.e., the degree of bending) of the connecting line formed by sequentially connecting the grayscale voltage values corresponding to the grayscales is. In this way, by adjusting the value of the preset parameter β, the radian of the connecting line (or an interpolation curve) formed by sequentially connecting the grayscale voltage values corresponding to the grayscales may be adjusted, thereby adjusting a radian of the gamma curve. As a result, a suitable preset parameter may be selected through different gamma curves, so that when the display apparatus performs a display according to the correspondences between the grayscales and the grayscale voltages, an accuracy of the brightness of the grayscale is improved, which more conforms to the gamma curve.

For example, the two adjacent first grayscales are the maximum grayscale and the minimum grayscale. For example, among the plurality of grayscales, the maximum grayscale is grayscale $G_{MAX}$, and the minimum grayscale is grayscale $G_{MIN}$. A grayscale voltage value corresponding to the maximum grayscale is $V_{MAX}$, and a grayscale voltage value corresponding to the minimum grayscale is $V_{MIN}$. In this case, a grayscale voltage value $V_i$ corresponding to each second grayscale $G_i$ between the maximum grayscale and the minimum grayscale may be expressed as $$V_i = \frac{(V_{MAX} - V_{MIN})}{\left(G_{MAX}^{\beta} - G_{MIN}^{\beta}\right)} \times G_i^{\beta} - \frac{(V_{MAX} - V_{MIN})}{\left(G_{MAX}^{\beta} - G_{MIN}^{\beta}\right)} \times G_{MIN}^{\beta} + V_{MAX},$$

i is a positive integer, and a value of i may be taken continuously in an interval from the minimum grayscale to the maximum grayscale. For example, in 256 grayscales, the maximum grayscale is grayscale 255, and the minimum grayscale is grayscale 0. A grayscale voltage value corresponding to the grayscale 255 is a voltage value $V_{M1}$ of a first voltage of a first voltage terminal $V_{MA}$, and a grayscale voltage value corresponding to the grayscale 0 is a voltage value $V_{M2}$ of a second voltage of a second voltage terminal $V_{MI}$. In this case, a grayscale voltage value corresponding to any of grayscales 1 to 254 may be expressed as $$V_i = \frac{(V_{M1} - V_{M2})}{\left(255^{\beta} - 0^{\beta}\right)} \times G_i^{\beta} - \frac{(V_{M1} - V_{M2})}{\left(255^{\beta} - 0^{\beta}\right)} \times 0^{\beta} + V_{M1},$$

that is, $$V_i = \frac{(V_{M1} - V_{M2})}{255^{\beta}} \times G_i^{\beta} + V_{M1},$$

i is the positive integer, and the value of i is continuously taken in an interval (0, 255).

In S30, a set of correspondences is obtained according to the plurality of grayscales and the corresponding plurality of grayscale voltage values.

The set of correspondences includes the plurality of grayscales and a plurality of register values in a one-to-one correspondence with the plurality of grayscales. Each register value is used to represent a grayscale voltage value of a respective grayscale.

It will be noted that in a set of correspondences, the grayscale may be expressed according to the actual situations. For example, the grayscale may be expressed in the binary number. That is, the grayscale is grayscale data. The grayscale may also be expressed in the decimal number. That is, the grayscale is the analog value of grayscale data. Meanings of the grayscale data and the data expressed by the grayscale are the same. The grayscale voltage value of the grayscale refers to an amplitude of the grayscale voltage of the grayscale. For example, the grayscale voltage is a DC voltage, and the grayscale voltage value is a voltage value of the DC voltage.

For example, a set of correspondences may be used for obtaining of grayscale voltage values of sub-pixels of a color (e.g., sub-pixels of a color in the sub-pixels of the first color, the sub-pixels of the second color, and the sub-pixels of the third color) in the display panel. In this way, a plurality of sets of correspondences may be obtained according to the above S10 to S30. The plurality of sets of correspondences include three sets of correspondences, and the three sets of correspondences are respectively used for the obtaining of grayscale voltage values of the sub-pixels of the first color, the sub-pixels of the second color, and the sub-pixels of the third color.

For example, for any grayscale data (i.e., any grayscale) in the image data, the display apparatus may obtain a register value corresponding to a grayscale of the grayscale data from a set of correspondence according to the obtained correspondences between the grayscales and the grayscale voltages and a plurality of grayscale data (i.e., a plurality of grayscales) in the image data that correspond to the plurality of sub-pixels in the display panel, determine a grayscale voltage value corresponding to the grayscale of the grayscale data, and output a grayscale voltage corresponding to the grayscale voltage value to a sub-pixel of the display panel according to the grayscale voltage value. In this way, a relationship between a grayscale and brightness displayed by each sub-pixel in the display panel may be close to the gamma curve, and the error between the displayed actual brightness and the target brightness may be reduced, so that a display effect is improved.

Figure 14:
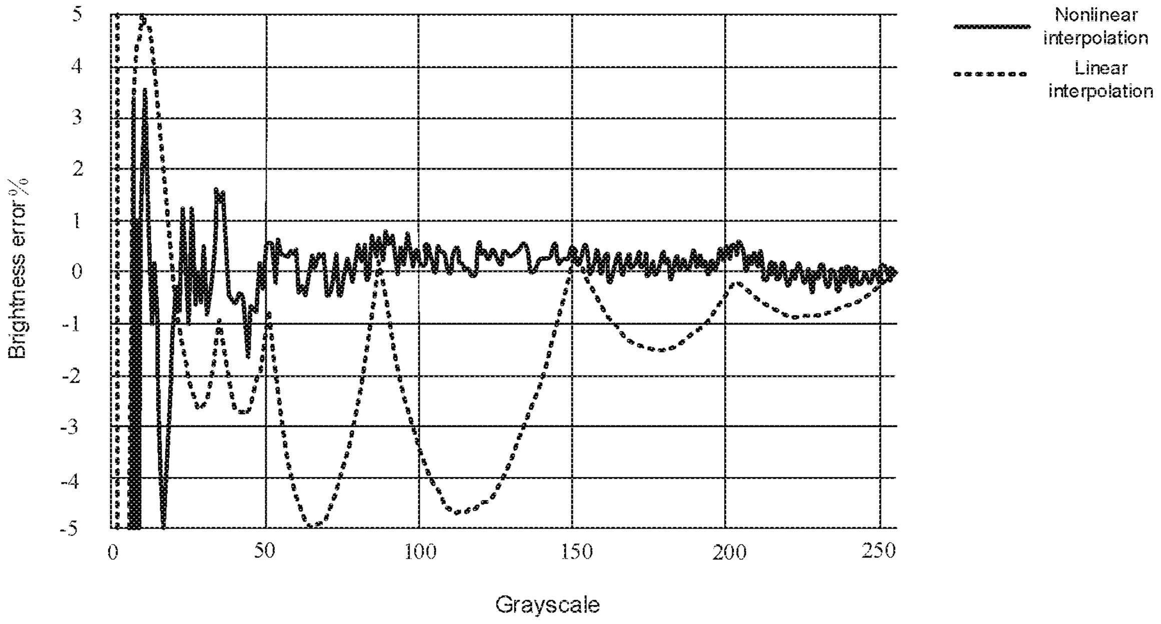
FIG. 14 is a distribution diagram showing brightness errors when different grayscales are displayed, in accordance with some embodiments.

For example, FIG. 14 shows error distribution curves between the brightness values (i.e., the actual brightness values) of the displayed grayscales when the grayscale voltages corresponding to the grayscales obtained by using the linear interpolation and the nonlinear interpolation are used for displaying and the theoretical brightness values. Referring to FIG. 12 showing a case where the grayscale voltage value of the second grayscale is obtained by using the linear interpolation, a maximum error value between the displayed actual brightness value corresponding to the grayscale (e.g., the second grayscale) and the theoretical brightness value may exceed 5%. Referring to FIG. 12 showing a case where the grayscale voltage values of the second grayscales are obtained by using the nonlinear interpolation, an error value between the displayed brightness value corresponding to the grayscale (e.g., the second grayscale) and the theoretical value is approximately in a range of −2% to 2%. Therefore, the nonlinear interpolation is adopted in the embodiments of the present disclosure to obtain the grayscale voltage values corresponding to the grayscales, which may reduce the error between the actual brightness of the displayed grayscales and the target brightness, so that the display effect is improved.

Therefore, in the method for obtaining the correspondences between the grayscales and the grayscale voltages provided by the embodiments of the present disclosure, the grayscale voltage values corresponding to the at least two first grayscales in the plurality of grayscales are obtained; the grayscale voltage values in a one-to-one correspondence with the plurality of second grayscales between the two adjacent first grayscales are obtained according to the two adjacent first grayscales and the grayscale voltage values corresponding to the two adjacent first grayscales; a set of correspondences is obtained according to the plurality of grayscales and the plurality of grayscale voltage values corresponding to the plurality of grayscales; the set of correspondence includes the plurality of grayscales and the plurality of register values in a one-to-one correspondence with the plurality of grayscales; and each register value is used to represent the grayscale voltage value of the corresponding grayscale. In this way, during a display process, the display apparatus may, for a grayscale, obtain a register value corresponding to the grayscale according to a set of correspondences, and obtain a grayscale voltage value, corresponding to the grayscale, represented by the register value according to the register value, so that a grayscale voltage corresponding to the grayscale voltage value can be output to the display panel. As a result, when the sub-pixel displays the grayscale according to the grayscale voltage, the error between the displayed actual brightness value and the theoretical brightness value is small, which is more in line with the gamma curve, so that the display effect is improved and a correction of the display of the grayscale is realized.

Figure 15:
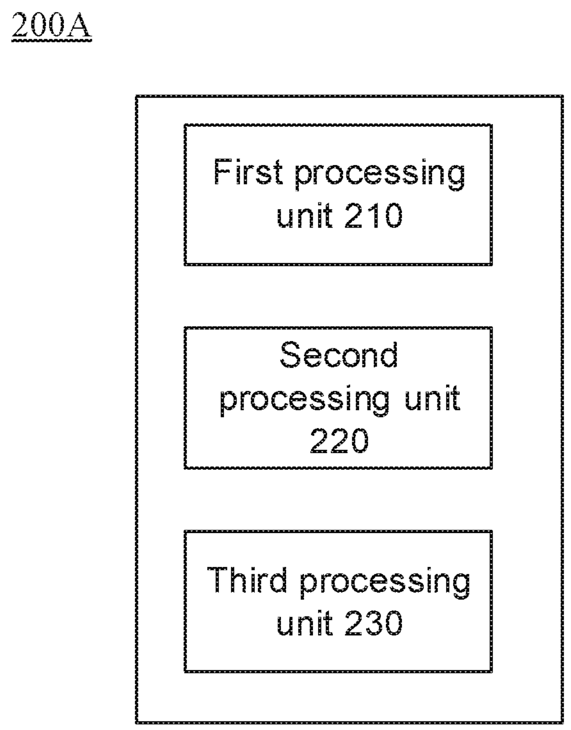
FIG. 15 is a structural diagram of an apparatus for obtaining correspondences between grayscales and grayscale voltages, in accordance with some embodiments.

Embodiments of the present disclosure provide an apparatus for obtaining correspondences between grayscales and grayscale voltages. As shown in FIG. 15, the apparatus 200A includes a first processing unit 210, a second processing unit 220, and a third processing unit 230.

The first processing unit is configured to obtain grayscale voltage values of at least two first grayscales in a plurality of grayscales. There exist a plurality of second grayscales between at least two adjacent first grayscales in the at least two first grayscales.

The second processing unit is configured to obtain grayscale voltage values in a one-to-one correspondence with the plurality of second grayscales between the two adjacent first grayscales according to the two adjacent first grayscales and the grayscale voltage values corresponding to the two adjacent first grayscales. In a coordinate system formed by grayscales and grayscale voltage values, a connecting line formed by sequentially connecting the grayscale voltage values corresponding to the plurality of second grayscales is nonlinear.

The third processing unit is configured to obtain a set of correspondences according to the plurality of grayscales and a plurality of grayscale voltage values corresponding to the plurality of grayscales. The set of correspondences includes the plurality of grayscales and a plurality of register values in a one-to-one correspondence with the plurality of grayscales. Each register value is used to represent a grayscale voltage value of a respective grayscale.

The embodiments of the apparatus described in FIG. 15 are merely illustrative. For example, the above unit division is merely a logical functional division, and there may exist other division manners in practical implementation. For example, a plurality of modules or assemblies may be combined or integrated into another system, or some features may be ignored or not executed. The functional units in the embodiments of the present disclosure may be integrated into one processing module or may be separate physical units, or two or more units may be integrated into one module. The above units in FIG. 15 may be implemented in a form of hardware or in a form of software functional unit. For example, when implemented by software, the first processing unit, the second processing unit, and the third processing unit described above may be implemented by software functional modules generated after at least one processor reads the program codes stored in a memory. The above units in FIG. 15 may also be implemented by different hardware in a computer (e.g., a display device). For example, a part of the first processing unit, the second processing unit, and the third processing unit are implemented by a part of processing resources in at least one processor (e.g., one or two cores in a multi-core processor), while another part of the first processing unit, the second processing unit, and the third processing unit are processed by remaining part of the processing resources in the at least one processor (e.g., other cores in the multi-core processor). For example, the form of hardware is adopted for implementation. For example, the above apparatus may be a programmable device, such as a hardware programmable device, such as a field programmable gate array (FPGA). In this case, the first processing unit, the second processing unit, and the third processing unit in the apparatus may each include a configurable logic block (CLB), and different units are coupled through internal connection lines. Obviously, the above functional units may also be implemented by means of a combination of software and hardware. For example, the first processing unit is implemented by a hardware circuit, while the second processing unit and the third processing unit are implemented by software functional modules generated after a CPU reads the program codes stored in the memory.

For more details of the implementations of the above functions by the units (e.g., including the first processing unit, the second processing unit, and the third processing unit) in FIG. 15, reference may be made to the descriptions in the foregoing method embodiments, which will not be repeated herein.

All the embodiments in the present description are described in an incremental manner. The same or similar parts among all the embodiments are referred to each other. Each embodiment focuses on differences between the embodiment and other embodiments.

The above embodiments may be implemented in whole or in part through software, hardware, firmware, or any combination thereof. When the above embodiments are implemented by using a software program, the software program may be implemented in a form of a computer program product in whole or in part. The computer program product includes one or more computer instructions. When the computer instructions are loaded and executed on a computer, processes or functions according to the embodiments of the present application are generated in whole or in part. The computer may be a general-purpose computer, a dedicated computer, a computer network or any other programmable device. The computer instructions may be stored in a computer-readable storage medium. The computer-readable storage medium may be any available medium that may be accessed by a computer, or a data storage device, such as a server including one or more available media, and a data center including one or more available media. The available medium may be a magnetic medium (e.g., a floppy disk, a magnetic disk or a magnetic tape), an optical medium (e.g., a digital versatile disk (DVD)) or a semiconductor medium (e.g., a solid state drive (SSD)), or the like.

It will be noted that beneficial effects of the apparatus described above are the same as the beneficial effects of the method described in some of the above embodiments, which will not be repeated herein.

Figure 16:
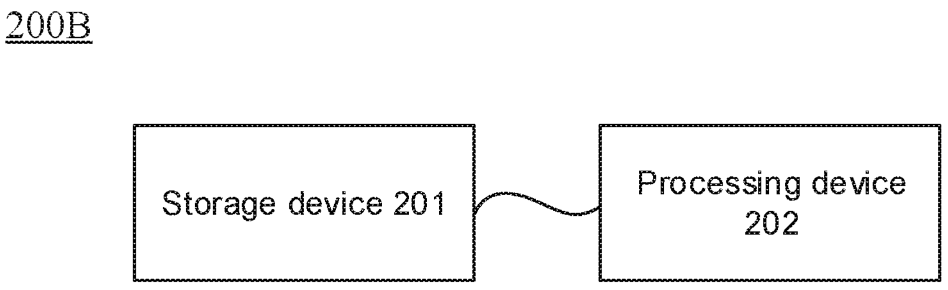
FIG. 16 is a structural diagram of another apparatus for obtaining correspondences between grayscales and grayscale voltages, in accordance with some embodiments.

Some embodiments of the present disclosure provide an apparatus for obtaining correspondences between grayscales and grayscale voltages. As shown in FIG. 16, the apparatus 200B includes a storage device 201 and a processing device 202. The processing device 202 is coupled to the storage device 201.

The storage device 201 stores therein one or more computer programs, e.g., one or more computer programs that may be run on the processing device 202. When the processing device 202 executes the computer program(s), the method as described in any of the above embodiments is implemented.

For example, the processing device 202 may be a processor, or may be a general term of a plurality of processing elements. For example, the processing device 202 may be a general-purpose central processing unit (CPU), a microprocessor, an application specific integrated circuit (ASIC), or one or more integrated circuits for controlling execution of programs of the solutions of the present disclosure, such as one or more microprocessors. For example, the storage device 201 may be a single memory, or may be a general term of a plurality of storage elements, and is used to store executable program codes or the like. Moreover, the storage device 201 may include a random access memory (RAM) or a non-volatile memory, such as a disk memory, and a flash memory.

For example, the storage device 201 is used to store application program codes for executing the solutions of embodiments of the present disclosure, and the execution is controlled by the processing device 202. The processing device 202 is used to execute the application program codes stored in the storage device 201, so that the processing device 202 can implement the method provided by any of the above embodiments of the present disclosure.

It will be noted that beneficial effects of the above apparatus are the same as the beneficial effects of the method described in some of the above embodiments, which will not be repeated herein.

Some embodiments of the present disclosure provide electronic equipment. The electronic equipment includes the display apparatus as described in any of the above embodiments and the apparatus as described in any of the above embodiments. In a case where the apparatus obtains the correspondences between the grayscales and the grayscale voltages, the correspondences may be transmitted to the display apparatus, and the memory in the display apparatus stores the correspondences.

Beneficial effects of the electronic equipment are the same as the beneficial effects of the display apparatus and the apparatus described in some of the above embodiments, which will not be described herein again.

Some embodiments of the present disclosure provide a computer-readable storage medium (e.g., a non-transitory computer-readable storage medium). The computer-readable storage medium stores therein computer program instructions that, when run on a computer (e.g., a processor in the computer), cause the computer to perform the method as described in any of the above embodiments, e.g., one or more steps in the method.

For example, the computer-readable storage medium may include, but is not limited to, a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage medium" may include, but is not limited to, wireless channels and various other media capable of storing, containing and/or carrying instructions and/or data.

Some embodiments of the present disclosure provide a computer program product. The computer program product includes computer program instructions that, when executed on a computer, cause the computer to perform the method as described in the above embodiments, e.g., one or more steps in the method.

Some embodiments of the present disclosure provide a computer program. When run on a computer, the computer program causes the computer to perform the method as described in the above embodiments, e.g., one or more steps in the method.

Beneficial effects of the computer-readable storage medium, the computer program product, and the computer program are the same as the beneficial effects of the method as described in some of the above embodiments, which will not be described herein again.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display apparatus, comprising:

a display panel including a plurality of sub-pixels;

a memory configured to store at least one set of correspondences, each set of correspondences including $2^N$ grayscale data and $2^N$ register values in a one-to-one correspondence with the $2^N$ grayscale data, each register value being used to represent a grayscale voltage value of a respective grayscale data, and N being a positive integer greater than or equal to 6; and a driver coupled to the memory, a signal transmission interface, and the display panel, wherein the memory and the signal transmission interface are coupled to different ends of the driver, respectively;

the driver is configured to: obtain the at least one set of correspondences from the memory; receive image data from the signal transmission interface, the image data including a plurality of grayscale data corresponding to the plurality of sub-pixels; for any grayscale data in the image data, obtain a register value corresponding to the grayscale data from a set of correspondences; and output, according to the register value, a grayscale voltage corresponding to a grayscale voltage value represented by the register value to a sub-pixel of the display panel;

wherein the display apparatus is capable of displaying $2^N$ grayscales in a one-to-one correspondence with the $2^N$ grayscale data; wherein the $2^N$ grayscales include at least two first grayscales and a plurality of second grayscales between two adjacent first grayscales in the at least two first grayscales, and the two adjacent first grayscales are respectively a maximum grayscale corresponding to a maximum grayscale voltage value and a minimum grayscale corresponding to a minimum grayscale voltage value; a grayscale voltage value of each second grayscale between the maximum grayscale and the minimum grayscale satisfies a formula:

$$V_i = \frac{(V_{MAX} - V_{MIN})}{\left(G_{MAX}^{\beta} - G_{MIN}^{\beta}\right)} \times G_i^{\beta} - \frac{(V_{MAX} - V_{MIN})}{\left(G_{MAX}^{\beta} - G_{MIN}^{\beta}\right)} \times G_{MIN}^{\beta} + V_{MAX}$$

wherein $V_{MAX}$ represents the maximum grayscale voltage value, $V_{MIN}$ represents the minimum grayscale voltage value, $G_{MAX}$ represents the maximum grayscale, $G_{MIN}$ represents the minimum grayscale, $G_i$ represents a second grayscale, $V_i$ represents a grayscale voltage value corresponding to the second grayscale $G_i$, and β represents a preset parameter.

2. The display apparatus according to claim 1, wherein the plurality of sub-pixels include sub-pixels of a first color, sub-pixels of a second color, and sub-pixels of a third color, and the first color, the second color, and the third color are three primary colors;

the at least one set of correspondences includes three sets of correspondences, and the three sets of correspondences are respectively used for obtaining of grayscale voltage values of the sub-pixels of the first color, the sub-pixels of the second color, and the sub-pixels of the third color in the display panel; and the driver is further configured to: for any grayscale data in the image data, determine a color of a sub-pixel corresponding to the grayscale data; determine a set of correspondences from the three sets of correspondences according to the color of the sub-pixel, the determined set of correspondences being used for obtaining of grayscale voltage values of sub-pixels, having a same color as the sub-pixel, in the sub-pixels of the first color, the sub-pixels of the second color, and the sub-pixels of the third color; and obtain a register value corresponding to the grayscale data from the determined set of correspondences.

3. The display apparatus according to claim 1, wherein the memory is a non-volatile memory; and the driver includes:

a random memory coupled to the non-volatile memory and configured to obtain and temporarily store the at least one set of correspondences from the non-volatile memory, the random memory being further coupled to the signal transmission interface, and further configured to obtain the image data from the signal transmission interface;

a plurality of registers coupled to the random memory;

a controller coupled to the random memory and the plurality of registers, the controller being configured to: control a register to obtain, according to each grayscale data in the image data, a register value corresponding to the grayscale data from a set of correspondences in the random memory, and control the register to store the register value; and a grayscale voltage output circuit coupled to the plurality of registers and the display panel, the grayscale voltage output circuit being configured to output, according to the register value stored in the register, a grayscale voltage corresponding to a grayscale voltage value represented by the register value to the display panel.

4. The display apparatus according to claim 3, wherein the grayscale voltage output circuit includes:

a first voltage generating circuit coupled to a first voltage terminal and a second voltage terminal, and configured to obtain a plurality of third voltages according to a first voltage of the first voltage terminal and a second voltage of the second voltage terminal, and the first voltage being greater than the second voltage; and a plurality of first gating circuits, each first gating circuit being coupled to the first voltage generating circuit, a register, and the display panel, and configured to output a voltage of the first voltage, the second voltage and the plurality of third voltages from the first voltage generating circuit to the display panel according to the register value stored in the register, the voltage being the grayscale voltage corresponding to the grayscale voltage value represented by the register value.

5. The display apparatus according to claim 4, wherein the grayscale voltage output circuit further includes:

a second voltage generating circuit coupled to a first reference voltage terminal and a second reference voltage terminal, and configured to obtain a plurality of divided voltages according to a first reference voltage of the first reference voltage terminal and a second reference voltage of the second reference voltage terminal;

a second gating circuit coupled to the first voltage terminal and the second voltage generating circuit, and configured to output a divided voltage of the plurality of divided voltages according to a register value among the $2^N$ register values that represents the maximum grayscale voltage value, this divided voltage being the first voltage; and a third gating circuit coupled to the second voltage terminal and the second voltage generating circuit, and configured to output a divided voltage of the plurality of divided voltages according to a register value among the $2^N$ register values that represents the minimum grayscale voltage value, this divided voltage being the second voltage.

6. The display apparatus according to claim 5, wherein the grayscale voltage output circuit further includes a plurality of operational amplifiers; wherein a first gating circuit is coupled to an operational amplifier, the second gating circuit is coupled to an operational amplifier, and the third gating circuit is coupled to an operational amplifier; each operational amplifier is configured to amplify a grayscale voltage from a respective gating circuit.

7. The display apparatus according to claim 5, wherein the second gating circuit is further coupled to a register;

the controller is configured to control the register coupled to the second gating circuit to: obtain and store the register value among the $2^N$ register values that represents the maximum grayscale voltage value; and output the register value among the $2^N$ register values that represents the maximum grayscale voltage value to the second gating circuit.

8. The display apparatus according to claim 5, wherein the third gating circuit is further coupled to a register;

the controller is configured to control the register coupled to the third gating circuit to: obtain and store the register value among the $2^N$ register values that represents the minimum grayscale voltage value; and output the register value among the $2^N$ register values that represents the minimum grayscale voltage value to the third gating circuit.

9. The display apparatus according to claim 5, wherein the first voltage generating circuit includes a first resistor string, and both ends of the first resistor string are respectively coupled to the second gating circuit and the third gating circuit.

10. The display apparatus according to claim 5, wherein the second voltage generating circuit includes a second resistor string, and both ends of the second resistor string are respectively coupled to the first reference voltage terminal and the second reference voltage terminal.

11. The display apparatus according to claim 5, wherein the first gating circuit, the second gating circuit, and the third gating circuit each adopt a multiplexer.

12. The display apparatus according to claim 1, wherein the preset parameter is in a range of −0.1 to 2.4, inclusive.

13. The display apparatus according to claim 1, wherein a grayscale and a grayscale voltage value corresponding to the grayscale satisfy a formula:

$$V_X = A \times G_X^{\beta} + B,$$

wherein the grayscale is an analog value of grayscale data, Vx represents the grayscale voltage value, Gx represents the grayscale, β represents a preset parameter, and A and B represent scale factors.

14. The display apparatus according to claim 13, wherein the preset parameter is in a range of −0.1 to 2.4, inclusive.

15. The display apparatus according to claim 1, wherein N is 8 or 10.

* * * * *